United States Patent
Hirashima et al.

(10) Patent No.: US 12,454,733 B2
(45) Date of Patent: *Oct. 28, 2025

(54) HIGH STRENGTH MEMBER, METHOD FOR MANUFACTURING HIGH STRENGTH MEMBER, AND METHOD FOR MANUFACTURING STEEL SHEET FOR HIGH STRENGTH MEMBER

(71) Applicant: JFE Steel Corporation, Tokyo (JP)

(72) Inventors: Takuya Hirashima, Tokyo (JP); Shinjiro Kaneko, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 1007 days.

This patent is subject to a terminal disclaimer.

(21) Appl. No.: 17/610,483

(22) PCT Filed: May 12, 2020

(86) PCT No.: PCT/JP2020/019021
§ 371 (c)(1),
(2) Date: Nov. 11, 2021

(87) PCT Pub. No.: WO2020/230796
PCT Pub. Date: Nov. 19, 2020

(65) Prior Publication Data
US 2022/0220577 A1    Jul. 14, 2022

(30) Foreign Application Priority Data

May 16, 2019  (JP) ................. 2019-092656
Jun. 28, 2019  (JP) ................. 2019-121144

(51) Int. Cl.
| | |
|---|---|
| C21D 9/46 | (2006.01) |
| C21D 6/00 | (2006.01) |
| C21D 8/02 | (2006.01) |
| C22C 38/00 | (2006.01) |
| C22C 38/02 | (2006.01) |
| C22C 38/06 | (2006.01) |
| C22C 38/08 | (2006.01) |
| C22C 38/14 | (2006.01) |
| C22C 38/20 | (2006.01) |
| C22C 38/22 | (2006.01) |
| C22C 38/24 | (2006.01) |
| C22C 38/26 | (2006.01) |
| C22C 38/38 | (2006.01) |

(52) U.S. Cl.
CPC .............. *C21D 9/46* (2013.01); *C21D 6/001* (2013.01); *C21D 6/002* (2013.01); *C21D 6/005* (2013.01); *C21D 6/008* (2013.01); *C21D 8/0205* (2013.01); *C21D 8/0226* (2013.01); *C21D 8/0236* (2013.01); *C22C 38/001* (2013.01); *C22C 38/002* (2013.01); *C22C 38/005* (2013.01); *C22C 38/02* (2013.01); *C22C 38/06* (2013.01); *C22C 38/08* (2013.01); *C22C 38/14* (2013.01); *C22C 38/20* (2013.01); *C22C 38/22* (2013.01); *C22C 38/24* (2013.01); *C22C 38/26* (2013.01); *C22C 38/38* (2013.01); *C21D 2211/002* (2013.01); *C21D 2211/008* (2013.01); *C21D 2221/01* (2013.01)

(58) Field of Classification Search
CPC ........................................ C21D 9/46
See application file for complete search history.

(56) References Cited

U.S. PATENT DOCUMENTS

| | | | |
|---|---|---|---|
| 9,610,624 B2 | 4/2017 | Jin et al. | |
| 10,870,902 B2 | 12/2020 | Ono et al. | |
| 12,043,883 B2* | 7/2024 | Hirashima | C21D 8/0226 |
| 2012/0060982 A1 | 3/2012 | Bohner et al. | |
| 2018/0100212 A1* | 4/2018 | Ono | C21D 8/0236 |

FOREIGN PATENT DOCUMENTS

| | | |
|---|---|---|
| CN | 103717773 A | 4/2014 |
| CN | 108603271 A | 9/2018 |
| EP | 2738280 A1 | 6/2014 |
| EP | 3415656 A1 | 12/2018 |
| EP | 3467135 A1 | 4/2019 |
| JP | 2003166035 A | 6/2003 |
| JP | 2012157902 A | 8/2012 |
| JP | 2017125228 A | 7/2017 |
| JP | 2017226901 A | 12/2017 |
| WO | 2016152163 A1 | 9/2016 |

OTHER PUBLICATIONS

Korean Office Action for Korean Application No. 10-2021-7036919, dated Aug. 10, 2023 with Concise Statement of Relevance of Office Action, 7 pages.
International Search Report and Written Opinion for International Application No. PCT/JP2020/019021, dated Aug. 18, 2020, 6 pages.
Liu et al., "Basic Technique of Automobile Metal Sheet Worker", 2010, 2 pages.
Chinese Office Action for Chinese Application No. 202080035625.5, dated Mar. 14, 2022 with Concise Statement of Relevance of Office Action, 11 pages.
Extended European Search Report for European Application No. 20805261.3, dated May 17, 2022, 11 pages.
Japanese Office Action for Japanese Application No. 2020-545826, dated Jan. 5, 2021 with Concise Statement of Relevance of Office Action.

* cited by examiner

*Primary Examiner* — Jophy S. Koshy
(74) *Attorney, Agent, or Firm* — Buchanan Ingersoll & Rooney PC

(57) ABSTRACT

A high strength member according to the present invention is the high strength member having a bending ridge line portion formed from a steel sheet, the member having a tensile strength of 1470 MPa or higher, a residual stress of 300 MPa or lower in an end surface of the bending ridge line portion, and a Vickers hardness (HV) of 200 or higher and 450 or lower in the end surface of the bending ridge line portion.

5 Claims, 2 Drawing Sheets

HIGH STRENGTH MEMBER, METHOD FOR MANUFACTURING HIGH STRENGTH MEMBER, AND METHOD FOR MANUFACTURING STEEL SHEET FOR HIGH STRENGTH MEMBER

CROSS REFERENCE TO RELATED APPLICATIONS

This is the U.S. National Phase application of PCT/JP2020/019021, filed May 12, 2020, which claims priority to Japanese Patent Application No. 2019-092656, filed May 16, 2019 and Japanese Patent Application No. 2019-121144, filed Jun. 28, 2019, the disclosures of these applications being incorporated herein by reference in their entireties for all purposes.

FIELD OF THE INVENTION

The present invention relates to a high strength member to be used for automotive parts or the like, a method for manufacturing the high strength member, and a method for manufacturing a steel sheet for the high strength member. More specifically, the present invention relates to a high strength member having excellent delayed fracture resistance and a method for manufacturing the high strength member. In addition, the present invention relates to a method for manufacturing a steel sheet for the high strength member.

BACKGROUND OF THE INVENTION

Nowadays, there is a trend toward using a high strength steel sheet having a TS (tensile strength) of 1320 MPa to 1470 MPa class for automotive body skeleton parts such as those for center pillar R/F (reinforcement), bumpers, impact beam parts, and the like (hereinafter, also referred to as "parts"). Moreover, consideration is also being given to using a steel sheet having strength represented by a TS of 1800 MPa (1.8 GPa) class or higher for the parts to further decrease the weight of an automotive body.

There is an increasing risk of delayed fracture occurring due to an increase in the strength of a steel sheet. Nowadays, since there is a risk of delayed fracture occurring in a sample which has been formed into the shape of a part, in particular, occurring in the sheared end surface of a bent portion, in which strain is concentrated, inhibiting delayed fracture from starting in such a sheared end surface is important.

For example, Patent Literature 1 provides a steel sheet having excellent delayed fracture resistance after forming has been performed, in which the steel sheet has a chemical composition containing C: 0.05% to 0.3%, Si: 3.0% or less, Mn: 0.01% to 3.0%, P: 0.02% or less, S: 0.02% or less, Al: 3.0% or less, N: 0.01% or less, and a balance of Fe and incidental impurities, and in which the grain size and density of the oxides, sulfides, complex crystallized products, and complex precipitated products of Mg are specified.

Patent Literature 2 provides a method for manufacturing a formed member having excellent delayed fracture resistance, in which residual stress in a sheared end surface is decreased by performing shot peening on the sheared end surface of a steel sheet having a TS of 1180 MPa or higher.

PATENT LITERATURE

PTL 1: Japanese Unexamined Patent Application Publication No. 2003-166035

PTL 2: Japanese Unexamined Patent Application Publication No. 2017-125228

SUMMARY OF THE INVENTION

The technique disclosed in Patent Literature 1 provides a steel sheet having excellent delayed fracture resistance by specifying the chemical composition and the grain size and density of the precipitates in steel. However, since the C content of the steel sheet according to Patent Literature 1 is low, the strength of the steel sheet is lower than that of the steel sheet to be used for the high strength member according to aspects of the present invention, that is, lower than 1470 MPa in terms of TS. Even in the case where there is an improvement in the strength of the steel sheet according to Patent Literature 1 by, for example, increasing the C content, it is considered that, since there is an increase in residual stress in the end surface due to an increase in strength, there is a deterioration in delayed fracture resistance.

The technique disclosed in Patent Literature 2 provides a formed member having excellent delayed fracture resistance by performing shot peening on the sheared end surface to decrease residual stress in the end surface. However, since the residual stress is higher than that specified in accordance with aspects of the present invention, which is 300 MPa or lower, the effect of improving delayed fracture resistance is insufficient.

Aspects of the present invention have been completed in view of the situation described above, and an object according to aspects of the present invention is to provide a high strength member having excellent delayed fracture resistance and a method for manufacturing the high strength member.

In accordance with aspects of the present invention, the expression "high strength" denotes a case of a tensile strength (TS) of 1470 MPa or higher.

In accordance with aspects of the present invention, the expression "excellent delayed fracture resistance" denotes a case where, as described in Examples, when "critical applied stress" is defined as the maximum applied stress with which delayed fracture does not occur under the condition that a member which has been formed by performing bending work on a steel sheet is immersed in hydrochloric acid having a pH of 1 (25° C.), the critical applied stress is equal to or higher than the yield strength (YS) multiplied by 1.10.

The present inventors diligently conducted investigations to solve the problems described above. The present inventors found that it is possible to obtain a high strength member having excellent delayed fracture resistance when a high strength member having a bending ridge line portion is formed from a steel sheet by controlling the tensile strength of the member to be 1470 MPa or higher, residual stress in the end surface of the bending ridge line portion to be 300 MPa or lower, and Vickers hardness (HV) in the end surface of the bending ridge line portion to be 200 or higher and 450 or lower, which has led to the completion of aspects of the present invention. The problems described above are solved by using the following means.

[1] A high strength member having a bending ridge line portion formed from a steel sheet, the member having
  a tensile strength of 1470 MPa or higher,
  a residual stress of 300 MPa or lower in an end surface of the bending ridge line portion, and
  a Vickers hardness (HV) of 200 or higher and 450 or lower in the end surface of the bending ridge line portion.

[2] The high strength member according to item [1], in which the steel sheet has a chemical composition containing, by mass %,
C: 0.17% or more and 0.35% or less,
Si: 0.001% or more and 1.2% or less,
Mn: 0.9% or more and 3.2% or less,
P: 0.020% or less,
S: 0.0010% or less,
Al: 0.010% or more and 0.20% or less,
N: 0.010% or less, and a balance of Fe and incidental impurities, and
a microstructure, in which a total area fraction of one or both of bainite containing carbides having an average grain size of 50 nm or less and martensite containing carbides having an average grain size of 50 nm or less is 90% or more.

[3] The high strength member according to item [1], in which the steel sheet has a chemical composition containing, by mass %,
C: 0.17% or more and 0.35% or less,
Si: 0.001% or more and 1.2% or less,
Mn: 0.9% or more and 3.2% or less,
P: 0.020% or less,
S: 0.0010% or less,
Al: 0.010% or more and 0.20% or less,
N: 0.010% or less,
Sb: 0.001% or more and 0.10% or less, and a balance of Fe and incidental impurities, and
a microstructure, in which a total area fraction of one or both of bainite containing carbides having an average grain size of 50 nm or less and martensite containing carbides having an average grain size of 50 nm or less is 90% or more.

[4] The high strength member according to item [2] or [3], in which the steel sheet has the chemical composition further containing, by mass %,
B: 0.0002% or more and less than 0.0035%.

[5] The high strength member according to any one of items [2] to [4], in which the steel sheet has the chemical composition further containing, by mass %, at least one selected from
Nb: 0.002% or more and 0.08% or less, and
Ti: 0.002% or more and 0.12% or less.

[6] The high strength member according to any one of items [2] to [5], in which the steel sheet has the chemical composition further containing, by mass %, at least one selected from
Cu: 0.005% or more and 1% or less, and
Ni: 0.005% or more and 1% or less.

[7] The high strength member according to any one of items [2] to [6], in which the steel sheet has the chemical composition further containing, by mass %, at least one selected from
Cr: 0.01% or more and 1.0% or less,
Mo: 0.01% or more and less than 0.3%,
V: 0.003% or more and 0.5% or less,
Zr: 0.005% or more and 0.20% or less, and
W: 0.005% or more and 0.20% or less.

[8] The high strength member according to any one of items [2] to [7], in which the steel sheet has the chemical composition further containing, by mass %, at least one selected from
Ca: 0.0002% or more and 0.0030% or less,
Ce: 0.0002% or more and 0.0030% or less,
La: 0.0002% or more and 0.0030% or less, and
Mg: 0.0002% or more and 0.0030% or less.

[9] The high strength member according to any one of items [2] to [8], in which the steel sheet has the chemical composition further containing, by mass %,
Sn: 0.002% or more and 0.1% or less.

[10] A method for manufacturing a high strength member, the method including
a bending work process of cutting a steel sheet having a tensile strength of 1470 MPa or higher and performing bending work on the cut steel sheet and
an end surface treatment process of heating an end surface, which has been formed by cutting, at a temperature of 400° C. or higher and 900° C. or lower for more than 0 seconds and 10 seconds or less after the bending work process.

[11] A method for manufacturing a high strength member, the method including
a bending work process of cutting the steel sheet according to any one of items [2] to [9] and performing bending work on the cut steel sheet and
an end surface treatment process of heating an end surface, which has been formed by cutting, at a temperature of 400° C. or higher and 900° C. or lower for more than 0 seconds and 10 seconds or less after the bending work process.

[12] A method for manufacturing a high strength member, the method including
an end surface treatment process of cutting a steel sheet having a tensile strength of 1470 MPa or higher and heating an end surface, which has been formed by cutting, at a temperature of 400° C. or higher and 900° C. or lower for more than 0 seconds and 10 seconds or less and
a bending work process of performing bending work on the steel sheet, which has been subjected to the end surface treatment process.

[13] A method for manufacturing a high strength member, the method including
an end surface treatment process of cutting the steel sheet according to any one of items [2] to [9] and heating an end surface, which has been formed by cutting, at a temperature of 400° C. or higher and 900° C. or lower for more than 0 seconds and 10 seconds or less and
a bending work process of performing bending work on the steel sheet, which has been subjected to the end surface treatment process.

[14] A method for manufacturing a steel sheet for the high strength member manufactured by using the method for manufacturing a high strength member according to any one of items [10] to [13], the method for manufacturing a steel sheet including
a hot rolling process of performing hot rolling on a steel material,
a cold rolling process of performing cold rolling on a hot rolled steel sheet, which has been obtained by performing the hot rolling process, and
an annealing process of heating a cold rolled steel sheet, which has been obtained by performing the cold rolling process, to an annealing temperature equal to or higher than an $A_3$ temperature, cooling the heated steel sheet to a cooling stop temperature of 350° C. or lower at an average cooling rate of 3° C./sec or higher in a temperature range from the annealing temperature to a temperature of 550° C., and holding the cooled steel sheet in a temperature range of 100° C. or higher and 260° C. or lower for 20 seconds or more and 1500 seconds or less.

According to aspects of the present invention, it is possible to provide a high strength member having excellent delayed fracture resistance, a method for manufacturing the high strength member, and a method for manufacturing a steel sheet for the high strength member. In addition, by using the high strength member according to aspects of the present invention for an automotive body structural member, it is possible to realize an improvement in both strength and delayed fracture resistance of an automotive steel sheet. That is, there is an improvement in the quality of an automotive body due to aspects of the present invention.

DETAILED DESCRIPTION OF EMBODIMENTS OF THE INVENTION

Figure 1:
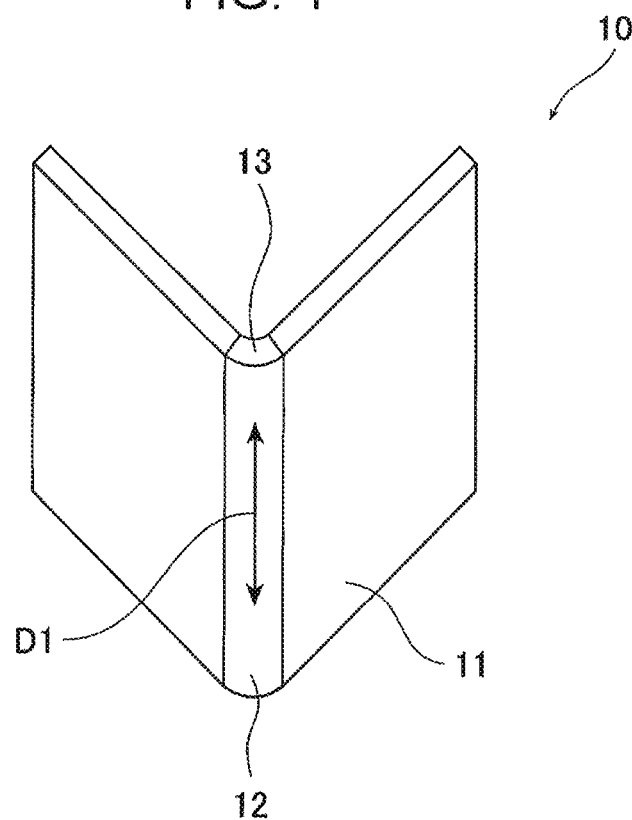
FIG. 1 is a perspective view of an example of a high strength member according to aspects of the present invention.

Hereafter, embodiments of the present invention will be described. Here, the present invention is not limited to the embodiments below.

Aspects of the present invention include a high strength member having a bending ridge line portion formed from a steel sheet, the member having a tensile strength of 1470 MPa or higher, a residual stress of 300 MPa or lower in the end surface of the bending ridge line portion, and a Vickers hardness (HV) of 200 or higher and 450 or lower in the end surface of the bending ridge line portion.

As long as it is possible to obtain a high strength member which satisfies these conditions, there is no particular limitation on the steel sheet to be used for the high strength member. Hereafter, although the preferable steel sheet to be used for the high strength member according to aspects of the present invention will be described, the steel sheet to be used for the high strength member according to aspects of the present invention is not limited to the steel sheet described below.

It is preferable that the preferable steel sheet to be used for the high strength member have the chemical composition and the microstructure described below. Here, as long as it is possible to obtain a high strength member according to aspects of the present invention, it is not always necessary to use a steel sheet having the chemical composition and the microstructure described below.

First, the preferable chemical composition of the preferable steel sheet (material steel sheet) used for the high strength member will be described. In the description of the preferable chemical composition below, "%", which is a unit of the content of each of the compositions, denotes "mass %".

<C: 0.17% or More and 0.35% or Less>

C is an element which improves hardenability. To achieve a TS of 1470 MPa or more by achieving sufficient total area fraction of one or both of specified martensite and bainite and by increasing the strength of martensite and bainite, it is preferable that the C content be 0.17% or more, more preferably 0.18% or more, or even more preferably 0.19% or more. On the other hand, in the case where the C content is more than 0.35%, even if heating is performed after bending work has been performed, residual stress in the end surface of a bending ridge line portion is higher than 300 MPa, which may result in a deterioration in delayed fracture resistance. Therefore, it is preferable that the C content be 0.35% or less, more preferably 0.33% or less, or even more preferably 0.31% or less.

<Si: 0.001% or More and 1.2% or Less>

Si is an element which increases strength through solid solution strengthening. In addition, in the case where a steel sheet is held in a temperature range of 200° C. or higher, Si contributes to improving elongation by inhibiting the formation of an excessive amount of carbides having a large grain size. Moreover, since Si also contributes to inhibiting the formation of MnS by decreasing the amount of Mn segregated in the central portion in the thickness direction, there is an improvement in delayed fracture resistance. To sufficiently realize the effects described above, it is preferable that the Si content be 0.001% or more, more preferably 0.003% or more, or even more preferably 0.005% or more. On the other hand, in the case where the Si content is excessively large, since MnS having a large grain size in the thickness direction tends to be formed, there is a deterioration in delayed fracture resistance. Therefore, it is preferable that the Si content be 1.2% or less, more preferably 1.1% or less, or even more preferably 1.0% or less.

<Mn: 0.9% or More and 3.2% or Less>

Mn is added to improve the hardenability of steel and to achieve sufficient total area fraction of one or both of specified martensite and bainite. In the case where the Mn content is less than 0.9%, there may be a decrease in strength due to ferrite being formed in the surface layer of a steel sheet. Therefore, it is preferable that the Mn content be 0.9% or more, more preferably 1.0% or more, or even more preferably 1.1% or more. In addition, to inhibit a deterioration in delayed fracture resistance due to an increase in the amount of MnS, it is preferable that the Mn content be 3.2% or less, more preferably 3.1% or less, or even more preferably 3.0% or less.

<P: 0.020% or Less>

Although P is an element which increases the strength of steel, in the case where the P content is large, there is a deterioration in delayed fracture resistance. Therefore, it is preferable that the P content be 0.020% or less, more preferably 0.015% or less, or even more preferably 0.010% or less. Here, although there is no particular limitation on the lower limit of the P content, the current industrially applicable lower limit of the P content is about 0.003%.

<S: 0.0010% or Less>

S forms inclusions such as MnS, TiS, and Ti (C, S). To inhibit a deterioration in delayed fracture resistance due to such inclusions, it is preferable that the S content be 0.0010% or less, more preferably 0.0009% or less, even more preferably 0.0007% or less, or especially preferably 0.0005% or less. Here, although there is no particular limitation on the lower limit of the S content, the current industrially applicable lower limit of the S content is about 0.0002%.

<Al: 0.010% or More and 0.20% or Less>

Al is added to decrease the amounts of inclusions having a large grain size in steel by sufficiently performing deoxidization. To realize such an effect, it is preferable that the Al content be 0.010% or more, or more preferably 0.015% or more. On the other hand, in the case where the Al content is more than 0.20%, since Fe-based carbides such as cementite, which are formed when coiling is performed after hot rolling has been performed, are less likely to form solid solutions in an annealing process, inclusions and carbides having a large grain size may be formed, which may result in a deterioration in delayed fracture resistance. Therefore, it is preferable that the Al content be 0.20% or less, more preferably 0.17% or less, or even more preferably 0.15% or less.

<N: 0.010% or Less>

N is an element which forms nitride- and carbonitride-based inclusions having a large grain size such as TiN, (Nb, Ti) (C, N), and AlN in steel and which causes a deterioration in delayed fracture resistance through the formation of these inclusions. To inhibit a deterioration in delayed fracture resistance, it is preferable that the N content be 0.010% or less, more preferably 0.007% or less, or even more preferably 0.005% or less. Here, although there is no particular limitation on the lower limit of the N content, the current industrially applicable lower limit of the N content is about 0.0006%.

<Sb: 0.001% or More and 0.10% or Less>

Sb inhibits decarburization from occurring due to oxidation and nitridation of the surface layer of a steel sheet by inhibiting oxidation and nitridation of the surface layer of the steel sheet. Inhibiting decarburization contributes to increasing strength by inhibiting the formation of ferrite in the surface layer of a steel sheet. Moreover, inhibiting decarburization also contributes to improving delayed fracture resistance. From such viewpoints, it is preferable that the Sb content be 0.001% or more, more preferably 0.002% or more, or even more preferably 0.003% or more. On the other hand, in the case where the Sb content is more than 0.10%, since Sb promotes crack generation as a result of being segregated at prior austenite ($\gamma$) grain boundaries, there may be a deterioration in delayed fracture resistance. Therefore, it is preferable that the Sb content be 0.10% or less, more preferably 0.08% or less, or even more preferably 0.06% or less. Although it is preferable that Sb be added, in the case where it is possible to sufficiently realize the effects of improving the strength and delayed fracture resistance of a steel sheet without adding Sb, Sb need not be added.

It is preferable that the preferable steel to be used for the high strength member according to aspects of the present invention fundamentally contain the composition described above and a balance of Fe and incidental impurities. The preferable steel to be used for the high strength member according to aspects of the present invention may contain the optional elements described below within ranges in which there is no decrease in the effect according to aspects of the present invention. Here, in the case where one of the optional elements described below is contained in an amount less than the lower limit of the content of the element described below, such an element is regarded as being contained as an incidental impurity.

<B: 0.0002% or More and Less than 0.0035%>

Since B is an element which improves the hardenability of steel, B has the advantage of forming martensite and bainite in a specified amount in terms of area fraction, even in the case where the Mn content is small. To realize such an effect of B, it is preferable that the B content be 0.0002% or more, more preferably 0.0005% or more, or even more preferably 0.0007% or more. In addition, to fix N, it is preferable that Ti be added in an amount of 0.002% or more in combination with B. On the other hand, in the case where the B content is 0.0035% or more, since there is a decrease in rate at which cementite forms a solid solution when annealing is performed, Fe-based carbides such as cementite remain undissolved, which results in a deterioration in delayed fracture resistance due to the formation of inclusions and carbides having a large grain size. Therefore, in the case where B is added, it is preferable that the B content be less than 0.0035%, more preferably 0.0030% or less, or even more preferably 0.0025% or less.

<At Least One Selected from Nb: 0.002% or More and 0.08% or Less and Ti: 0.002% or More and 0.12% or Less>

Nb and Ti contribute to increasing strength by decreasing prior austenite ($\gamma$) grain size. From such a viewpoint, it is preferable that each of the Nb content and the Ti content be 0.002% or more, more preferably 0.003% or more, or even more preferably 0.005% or more. On the other hand, in the case where the Nb content or the Ti content is large, since there is an increase in the amounts of Nb-based precipitates having a large grain size such as NbN, Nb (C, N), and (Nb, Ti) (C, N) and Ti-based precipitates having a large grain size such as TiN, Ti (C, N), Ti (C, S), and TiS, which remain undissolved when a slab is heated in a hot rolling process, there is a deterioration in delayed fracture resistance. Therefore, in the case where Nb is added, it is preferable that the Nb content be 0.08% or less, more preferably 0.06% or less, or even more preferably 0.04% or less. In addition, in the case where Ti is added, it is preferable that the Ti content be 0.12% or less, more preferably 0.10% or less, or even more preferably 0.08% or less.

<At Least One Selected from Cu: 0.005% or More and 1% or Less and Ni: 0.005% or More and 1% or Less>

Cu and Ni are effective for improving the corrosion resistance of automobiles in a practical usage environment and for inhibiting hydrogen from entering a steel sheet by coating the surface of the steel sheet with corrosion products. In addition, to improve delayed fracture resistance, it is preferable that each of the Cu content and the Ni content be 0.005% or more, or more preferably 0.008% or more. However, in the case where the Cu content or the Ni content is excessively large, surface defects are induced, and there is a deterioration in coatability and phosphatability. Therefore, in the case where at least one of Cu and Ni is added, it is preferable that each of the Cu content and the Ni content be 1% or less, more preferably 0.8% or less, or even more preferably 0.6% or less.

<At Least One Selected from Cr: 0.01% or More and 1.0% or Less, Mo: 0.01% or More and Less than 0.3%, V: 0.003% or More and 0.5% or Less, Zr: 0.005% or More and 0.20% or Less, and W: 0.005% or More and 0.20% or Less>

Cr, Mo, and V may be added to improve the hardenability of steel. To realize such an effect, it is preferable that each of the Cr content and the Mo content be 0.01% or more, more preferably 0.02% or more, or even more preferably 0.03% or more. It is preferable that the V content be 0.003% or more, more preferably 0.005% or more, or even more preferably 0.007% or more. However, in the case where the content of any one of these elements is excessively large, there is a deterioration in delayed fracture resistance due to the coarsening of carbides. Therefore, in the case where Cr is added, it is preferable that the Cr content be 1.0% or less, more preferably 0.4% or less, or even more preferably 0.2% or less. In the case where Mo is added, it is preferable that the Mo content be less than 0.3%, more preferably 0.2% or less, or even more preferably 0.1% or less. In the case where V is added, it is preferable that the V content be 0.5% or less, more preferably 0.4% or less, or even more preferably 0.3% or less.

Zr and W contribute to increasing strength by decreasing prior austenite ($\gamma$) grain size. From such a viewpoint, it is preferable that each of the Zr content and W content be 0.005% or more, more preferably 0.006% or more, or even more preferably 0.007% or more. However, in the case where the Zr content or the W content is large, since there is an increase in the amounts of precipitates having a large grain size, which remain undissolved when a slab is heated in a hot rolling process, there is a deterioration in delayed fracture resistance. Therefore, in the case where at least one of Zr and W is added, it is preferable that each of the Zr content and the W content be 0.20% or less, more preferably 0.15% or less, or even more preferably 0.10% or less.

<At Least One Selected from Ca: 0.0002% or More and 0.0030% or Less, Ce: 0.0002% or More and 0.0030% or Less, La: 0.0002% or More and 0.0030% or Less, and Mg: 0.0002% or More and 0.0030% or Less>

Ca, Ce, and La contribute to improving delayed fracture resistance by fixing S in the form of sulfides. Therefore, it is preferable that the content of each of these elements be 0.0002% or more, more preferably 0.0003% or more, or even more preferably 0.0005% or more. On the other hand, in the case where the content of each of these elements is large, there is a deterioration in delayed fracture resistance due to an increase in the grain size of sulfides. Therefore, in the case where at least one of Ca, Ce, and La is added, it is preferable that the content of each of these elements be 0.0030% or less, more preferably 0.0020% or less, or even more preferably 0.0010% or less.

Since Mg fixes O in the form of MgO, which has a function of a hydrogen trap site in steel, Mg contributes to improving delayed fracture resistance. To realize such an effect, it is preferable that the Mg content be 0.0002% or more, more preferably 0.0003% or more, or even more preferably 0.0005% or more. On the other hand, in the case where the Mg content is large, there is a deterioration in delayed fracture resistance due to the coarsening of MgO. Therefore, in the case where Mg is added, it is preferable that the Mg content be 0.0030% or less, more preferably 0.0020% or less, or even more preferably 0.0010% or less.

<Sn: 0.002% or More and 0.1% or Less>

Sn inhibits decarburization from occurring due to oxidation and nitridation of the surface layer of a steel sheet by inhibiting oxidation and nitridation of the surface layer of the steel sheet. Inhibiting decarburization contributes to increasing strength by inhibiting the formation of ferrite in the surface layer of a steel sheet. From such a viewpoint, it is preferable that the Sn content be 0.002% or more, more preferably 0.003% or more, or even more preferably 0.004% or more. On the other hand, in the case where the Sn content is more than 0.1%, since Sn is segregated at prior austenite ($\gamma$) grain boundaries, there is a deterioration in delayed fracture resistance. Therefore, in the case where Sn is added, it is preferable that the Sn content be 0.1% or less, more preferably 0.08% or less, or even more preferably 0.06% or less.

Hereafter, preferable conditions applied for the microstructure of the steel sheet used for the high strength member according to aspects of the present invention will be described.

<Total Area Fraction of One or Both of Bainite Containing Carbides Having an Average Grain Size of 50 nm or Less and Martensite Containing Carbides Having an Average Grain Size of 50 nm or Less: 90% or More>

To achieve high strength represented by a TS of 1470 MPa or more, it is preferable that the total area fraction of one or both of bainite containing carbides having an average grain size of 50 nm or less and martensite containing carbides having an average grain size of 50 nm or less be 90% or more with respect to the whole steel sheet microstructure. In the case where such a total area fraction is less than 90%, since there is an increase in the amount of ferrite, there is a decrease in strength. In addition, to increase strength, it is more preferable that such a total area fraction be 91% or more, even more preferably 92% or more, or especially preferably 93% or more. Such a total area fraction may be 100%. In addition, the area fraction of any one of the two phases described above may be 90% or more, and the total area fraction of both phases may be 90% or more.

The meaning of the term "martensite" here does not include quenched martensite but tempered martensite. In accordance with aspects of the present invention, the term "martensite" denotes a hard phase which is formed from austenite in a low temperature range (equal to or lower than the martensite transformation temperature), and the term "tempered martensite" denotes a phase which is formed by reheating and tempering martensite. The term "bainite" denotes a hard phase which is formed from austenite in a comparatively low temperature range (equal to or higher than the martensite transformation temperature) and in which carbides having a small grain size are dispersed in needle- or plate-like ferrite.

Here, the remaining phases other than martensite and bainite are ferrite, pearlite, and retained austenite, and it is acceptable that the total amount of these remaining phases be less than 10%. Such a total amount may be 0%.

In accordance with aspects of the present invention, the term "ferrite" denotes a phase which is formed from austenite through transformation in a comparatively high temperature range and which is formed of crystal grains having a bcc lattice. The term "pearlite" denotes a phase which is formed of alternating layers of ferrite and cementite. The term "retained austenite" denotes austenite which has not transformed into martensite due to a decrease in the martensite transformation temperature to a temperature equal to or lower than room temperature.

The expression "carbides having an average grain size of 50 nm or less" in accordance with aspects of the present invention denotes carbides having a small grain size which are observed in bainite and martensite when observation is performed by using a SEM. Specific examples of carbides include Fe carbides, Ti carbides, V carbides, Mo carbides, W carbides, Nb carbides, and Zr carbides.

Here, the steel sheet may have a coated layer such as a hot-dip galvanized layer. Examples of such a coated layer include an electroplated coating layer, an electroless plated coating layer, and a hot-dip coated layer. An alloyed coated layer may be used.

Hereafter, the high strength member will be described.

The high strength member according to aspects of the present invention is a high strength member having a bending ridge line portion formed from a steel sheet, the member having a tensile strength of 1470 MPa or higher, a residual stress of 300 MPa or lower in the end surface of the bending ridge line portion, and a Vickers hardness (HV) of 200 or higher and 450 or lower in the end surface of the bending ridge line portion.

The high strength member according to aspects of the present invention is formed from a steel sheet and is a member formed by performing work such as forming work and bending work to obtain a predetermined shape. The high strength member according to aspects of the present invention can preferably be used for, for example, automotive parts.

The high strength member according to aspects of the present invention has a bending ridge line portion. The term "bending ridge line portion" in accordance with aspects of the present invention denotes a region of a steel sheet which has been subjected to bending work, the region having a shape that is not flat. An example of a high strength member 10, which is illustrated in FIG. 1, is formed by performing V-bend forming on a steel sheet 11. The high strength member 10 has a bending ridge line portion 12 on the side surface of the portion of the steel sheet 11 which has been subjected to bending work. An end surface 13 of the bending ridge line portion 12 is a thickness surface positioned on a side surface of the bending ridge line portion 12. The term "bending ridge line direction D1" in accordance with aspects of the present invention denotes a direction parallel to the bending ridge line portion 12.

There is no particular limitation on the bending angle as long as the high strength member according to aspects of the present invention has a residual stress of 300 MPa or lower in the end surface of the bending ridge line portion and a Vickers hardness (HV) of 200 or higher and 450 or lower in the end surface of the bending ridge line portion.

Although an example of the high strength member 10 illustrated in FIG. 1 has one bent portion, bending work may be performed at two or more positions to form two or more bending ridge line portions.

<Tensile Strength of Member: 1470 MPa or More>

The high strength member has a tensile strength (TS) of 1470 MPa or more. To achieve a tensile strength (TS) of 1470 MPa or more, it is preferable that the steel sheet described above be used.

The tensile strength (TS) and the yield strength (YS) in accordance with aspects of the present invention are determined in flat portions of the high strength member, which have not been subjected to bending work. In addition, in the case where the tensile strength (TS) and yield strength (YS) of an annealed steel sheet (steel sheet which has been subjected to an annealing process) before bending work is performed are determined, these determined values may be regarded as the determined values of the tensile strength (TS) and yield strength (YS) of a high strength member which has been obtained by using this annealed steel sheet. It is possible to determine the strength of a member by using the method described in Examples.

<Residual Stress in End Surface of Bending Ridge Line Portion: 300 MPa or Lower>

The high strength member has a residual stress of 300 MPa or lower in the end surface (thickness surface) of the bending ridge line portion. Consequently, since a crack is less likely to be generated in the end surface of the bending ridge line portion, it is possible to obtain a member having excellent delayed fracture resistance. To inhibit a crack from being generated due to delayed fracture, the residual stress is set to be 300 MPa or less, preferably 250 MPa or less, or more preferably 200 MPa or less. There is no particular limitation on the lower limit of the residual stress, and the residual stress may be compressive. It is possible to determine the residual stress in the end surface of the bending ridge line portion by using the method described in Examples in this DESCRIPTION.

<Vickers Hardness (HV) in End Surface of Bending Ridge Line Portion: 200 or Higher and 450 or Lower>

The high strength member has a Vickers hardness (HV) of 200 or higher and 450 or lower in the end surface (thickness surface) of the bending ridge line portion. Consequently, since a crack is less likely to be generated in the end surface of the bending ridge line portion, it is possible to obtain a member having excellent delayed fracture resistance. To inhibit a crack from being generated due to delayed fracture, the hardness is set to be 450 or less, preferably 430 or less, or more preferably 400 or less. In addition, in the case where the hardness in the end surface of the bending ridge line portion is low, there is an increase in difference from the hardness of the base steel, and crack generation is promoted. Therefore, to inhibit a crack from being generated due to delayed fracture and to achieve sufficient strength of the member, the Vickers hardness (HV) in the end surface is set to be 200 or more, preferably 220 or more, or more preferably 250 or more. It is possible to determine the Vickers hardness of the end surface of the bending ridge line portion by using the method described in Examples in this DESCRIPTION.

Hereafter, embodiments of the method for manufacturing the high strength member according to aspects of the present invention will be described.

An example of the embodiments of the method for manufacturing the high strength member according to aspects of the present invention includes a bending work process of cutting a steel sheet having a tensile strength of 1470 MPa or higher and performing bending work on the cut steel sheet and an end surface treatment process of heating an end surface, which has been formed by cutting, at a temperature of 400° C. or higher and 900° C. or lower for more than 0 seconds and 10 seconds or less after the bending work process.

In addition, another example of the embodiments of the method for manufacturing the high strength member according to aspects of the present invention includes a bending work process of cutting the steel sheet having the chemical composition described above and the microstructure described above and performing bending work on the cut steel sheet and an end surface treatment process of heating an end surface, which has been formed by cutting, at a temperature of 400° C. or higher and 900° C. or lower for more than 0 seconds and 10 seconds or less after the bending work process.

In addition, another example of the embodiments of the method for manufacturing the high strength member according to aspects of the present invention includes an end surface treatment process of cutting a steel sheet having a tensile strength of 1470 MPa or higher and heating an end surface, which has been formed by cutting, at a temperature of 400° C. or higher and 900° C. or lower for more than 0 seconds and 10 seconds or less and a bending work process of performing bending work on the steel sheet, which has been subjected to the end surface treatment process.

In addition, another example of the embodiments of the method for manufacturing the high strength member according to aspects of the present invention includes an end surface treatment process of cutting the steel sheet having the chemical composition described above and the microstructure described above and heating an end surface, which has been formed by cutting, at a temperature of 400° C. or higher and 900° C. or lower for more than 0 seconds and 10 seconds or less and a bending work process of performing bending work on the steel sheet, which has been subjected to the end surface treatment process.

[End Surface Treatment Process]

As described above, the method for manufacturing the high strength member according to aspects of the present invention includes an end surface treatment process of cutting a steel sheet and heating an end surface, which has been formed by cutting, at a temperature of 400° C. or higher and 900° C. or lower for more than 0 seconds and 10 seconds or less. Here, the steel sheet to be cut is, for example, a steel sheet having a tensile strength of 1470 MPa or higher. In addition, the steel sheet to be cut is, for example, a steel sheet having the chemical composition described above and the microstructure described above.

The meaning of the term "cutting" in accordance with aspects of the present invention includes cutting by known cutting methods such as a shear cutting method (machine cutting method), a laser cutting method, an electric cutting method such as a discharge cutting method, and a gas cutting method.

By performing the end surface treatment process, a crack is less likely to be generated in the end surface of the bending ridge line portion due to a decrease in residual stress and hardness in the end surface of the steel sheet, and it is possible to obtain a member having excellent delayed fracture resistance. There is no particular limitation on the method used for heating the end surface, and examples of the method for heating include a laser heating method.

To decrease the residual stress in the end surface, the end surface of the member formed by performing bending work on the steel sheet is heated at a temperature of 400° C. or higher and 900° C. or lower. In the case where the heating temperature is higher than 900° C., since ferrite having a large grain size is markedly formed, there is a deterioration in delayed fracture resistance due to a decrease in the strength and an excessive decrease in hardness of the formed member. Therefore, the heating temperature is set to be 900° C. or lower or preferably 870° C. or lower. In addition, in the case where the heating temperature is lower than 400° C., since heating capability is insufficient, there is no decrease in the hardness of the microstructure. Therefore, the heating temperature is set to be 400° C. or higher, preferably 450° C. or higher, more preferably 500° C. or higher, even more preferably higher than 600° C., or especially preferably 700° C. or higher. The heating time is set to be 10 seconds or less. In the case where the heating time is more than 10 seconds, since there is an increase in the grain size of the microstructure, there is a deterioration in delayed fracture resistance. Therefore, the heating time is set to be 10 seconds or less, preferably 9 seconds or less, or more preferably 8 seconds or less. There is no particular limitation on the heating time as long as the Vickers hardness in the end surface is 200 or more and 450 or less due to a decrease in the hardness of the microstructure. Therefore, the heating time is set to be more than 0 seconds, preferably one second or more, or more preferably 2 seconds or more.

Although there is no particular limitation on the region in which heating is performed, it is preferable that the region is within about 5 mm from the end surface of the bending ridge line portion to achieve sufficient strength of the formed member. In addition, although there is no particular limitation on a heating direction, it is preferable that the heating direction be perpendicular to the thickness surface to inhibit a variation in temperature in the thickness direction.

<Bending Work Process>

The method for manufacturing the high strength member according to aspects of the present invention includes a bending work process of performing bending work on a steel sheet. The bending work process may be performed before the end surface treatment process or after the end surface treatment process.

The bending work process according to aspects of the present invention includes, for example, at least one of four deformation styles, that is, bending deformation, deep drawing deformation, bulging deformation, and stretch flange deformation.

Hereafter, an embodiment of the method for manufacturing a steel sheet to be used for the high strength member manufactured by using the method for manufacturing the high strength member will be described.

In addition, an example of the embodiments of the method for manufacturing a steel sheet to be used for the high strength member according to aspects of the present invention includes a hot rolling process of performing hot rolling on steel (steel material), a cold rolling process of performing cold rolling on a hot rolled steel sheet, which has been obtained by performing the hot rolling process, and an annealing process of heating a cold rolled steel sheet, which has been obtained by performing the cold rolling process, to an annealing temperature equal to or higher than the $A_{c3}$ temperature, cooling the heated steel sheet to a cooling stop temperature of 350° C. or lower at an average cooling rate of 3° C./sec or higher in a temperature range from the annealing temperature to a temperature of 550° C., and holding the cooled steel sheet in a temperature range of 100° C. or higher and 260° C. or lower for 20 seconds or more and 1500 seconds or less.

Hereafter, these processes and a preferable casting process, which is performed before the hot rolling process, will be described. Here, the term "temperature" below denotes the surface temperature of a steel material (slab), a steel sheet, or the like, unless otherwise noted.

[Casting Process]

Steel having the chemical composition described above is cast. Although there is no particular limitation on the casting speed, it is preferable that the casting speed be 1.80 m/min or lower, more preferably 1.75 m/min or lower, or even more preferably 1.70 m/min or lower to improve delayed fracture resistance by inhibiting the formation of the inclusions described above. Although there is no particular limitation on the lower limit of the casting speed, it is preferable that the casting speed be 1.25 m/min or higher, or more preferably 1.30 m/min or higher from the viewpoint of productivity.

[Hot Rolling Process]

In the hot rolling process, for example, a steel material (slab) having the chemical composition described above is subjected to hot rolling. Although there is no particular limitation on the slab heating temperature, in the case where the slab heating temperature is 1200° C. or higher, since the solid solution of sulfides is promoted and there is a decrease in the amount of Mn segregated, there is a tendency for delayed fracture resistance to be improved due to a decrease in the amounts of above-described inclusions having a large grain size. Therefore, it is preferable that the slab heating temperature be 1200° C. or higher or more preferably 1220° C. or higher. In addition, it is preferable that the heating rate when slab heating is performed be 5° C./min to 15° C./min and that the slab soaking time be 30 minutes to 100 minutes.

It is preferable that the finishing delivery temperature be 840° C. or higher. In the case where the finishing delivery temperature is lower than 840° C., since it takes a time for the temperature to be decreased, inclusions are formed, which results in a deterioration in delayed fracture resistance, and which may result in a deterioration in the internal quality of the steel sheet. Therefore, it is preferable that the finishing delivery temperature be 840° C. or higher or more preferably 860° C. or higher. On the other hand, although there is no particular limitation on the upper limit of the finishing delivery temperature, it is preferable that the finishing delivery temperature be 950° C. or lower or more preferably 920° C. or lower so as not to cause difficulty in cooling to a coiling temperature.

It is preferable that the cooled hot rolled steel sheet be coiled at a temperature of 630° C. or lower. In the case where the coiling temperature is higher than 630° C., since there is a risk of decarburization occurring in the surface of the base steel, there may be a difference in microstructure between the internal portion and surface of the steel sheet, which may result in a variation in alloy concentration. In addition, due to decarburization occurring in the surface layer, there is a decrease in the area fractions of bainite and martensite containing carbides in steel in the surface layer, and there is an increased difficulty in achieving the desired strength. Therefore, it is preferable that the coiling temperature be 630° C. or lower, or more preferably 600° C. or lower. Although there is no particular limitation on the lower limit of the coiling temperature, it is preferable that the coiling temperature be 500° C. or higher to inhibit a deterioration in cold rolling capability.

[Cold Rolling Process]

In the cold rolling process, the hot rolled steel sheet, which has been obtained by performing hot rolling, is subjected to cold rolling. In the cold rolling process, a cold rolled steel sheet is manufactured by performing cold rolling, for example, after pickling has been performed on the hot rolled steel sheet coiled as described above. There is no particular limitation on the conditions applied for pickling. In the case where the rolling reduction ratio is less than 20%, there is a risk of non-uniform microstructure formed due to poor surface flatness. Therefore, it is preferable that the rolling reduction ratio be 20% or more, more preferably 30% or more, or even more preferably 40% or more.

[Annealing Process]

The cold rolled steel sheet, which has been obtained by performing cold rolling, is heated to an annealing temperature equal to or higher than the $A_3$ temperature. In the case where the annealing temperature is lower than the $A_3$ temperature, since ferrite is formed in the microstructure, it is not possible to achieve the desired strength. Therefore, the annealing temperature is set to be equal to or higher than the $A_{c3}$ temperature, preferably equal to or higher than the $A_{c3}$ temperature+10° C., or more preferably equal to or higher than the $A_{c3}$ temperature+20° C. Although there is no particular limitation on the upper limit of the annealing temperature, it is preferable that the annealing temperature be 900° C. or lower to inhibit a deterioration in delayed fracture resistance by inhibiting an increase in austenite grain size. Here, soaking may be performed at the annealing temperature after heating has been performed to the annealing temperature equal to or higher than the $A_{c3}$ temperature.

The $A_{c3}$ temperature is calculated by using the equation below. In addition, in the equation below, the expression "(% with an atomic symbol)" denotes the content (mass %) of the corresponding element.

$$A_{c3} \text{ temperature (° C.)}=910-203\sqrt{(\% \text{ C})}+45(\% \text{ Si})- \\ 30(\% \text{ Mn})-20(\% \text{ Cu})-15(\% \text{ Ni})+11(\% \text{ Cr})+ \\ 32(\% \text{ Mo})+104(\% \text{ V})+400(\% \text{ Ti})+460(\% \text{ Al})$$

As described above, after the cold rolled steel sheet has been heated to the annealing temperature equal to or higher than the $A_{c3}$ temperature, the heated steel sheet is cooled to a cooling stop temperature of 350° C. or lower at an average cooling rate of 3° C./sec or higher in a temperature range from the annealing temperature to a temperature of 550° C., and the cooled steel sheet is held in a temperature range of 100° C. or higher and 260° C. or lower for 20 seconds or more and 1500 seconds or less.

In the case where the average cooling rate in a temperature range from the annealing temperature to a temperature of 550° C. is lower than 3° C./sec, since an excessive amount of ferrite is formed, it is difficult to achieve the desired strength. In addition, since ferrite is formed in the surface layer, it is difficult to achieve sufficient volume fraction of bainite and martensite containing carbides in the vicinity of the surface layer, which results in a deterioration in delayed fracture resistance. Therefore, the average cooling rate in a temperature range from the annealing temperature to a temperature of 550° C. is set to be 3° C./sec or higher, preferably 5° C./sec or higher, or more preferably 10° C./sec or higher. Here, although there is no particular limitation on the upper limit of the average cooling rate, in the case where the cooling rate is excessively high, since the degree of martensite transformation tends to vary between positions in the width direction of the coil, the steel sheet may come into contact with the equipment due to a deterioration in shape. Therefore, it is preferable that the cooling rate be 3000° C./sec or lower to achieve a minimum acceptable level of shape.

The average cooling rate in a temperature range from the annealing temperature to a temperature of 550° C. is calculated according to the expression "(annealing temperature–550° C.)/(cooling time from annealing temperature to a temperature of 550° C.)", unless otherwise noted.

The cooling stop temperature is set to be 350° C. or lower. In the case where the cooling stop temperature is higher than 350° C., since tempering does not sufficiently progress, quenched martensite and retained austenite remain in the final microstructure, which results in a deterioration in delayed fracture resistance due to an increase in hardness in the end surface of the bending ridge line portion. Therefore, the cooling stop temperature is set to be 350° C. or lower, preferably 300° C. or lower, or more preferably 250° C. or lower to achieve excellent delayed fracture resistance. Here, although there is no particular limitation on the lower limit of the cooling stop temperature, it is preferable that the cooling stop temperature be 0° C. or higher to easily achieve a target temperature when reheating is performed thereafter.

Carbides distributed within bainite grains are carbides which are formed when the steel sheet is held in a low temperature range after quenching has been performed, and the carbides function as the hydrogen trap site and trap hydrogen, which results in inhibiting a deterioration in delayed fracture resistance. In the case where the holding temperature is lower than 100° C. or the holding time is less than 20 seconds, since bainite is not formed, and since quenched martensite containing no carbides is formed, it is not possible to realize the effect described above due to an increase in hardness in the end surface of the bending ridge line portion.

In addition, in the case where the holding temperature is higher than 260° C. or the holding time is more than 1500 seconds, since decarburization occurs, and since carbides having a large grain size are formed within bainite grains, there is an excessive decrease in hardness, which results in a deterioration in delayed fracture resistance.

Therefore, the holding temperature is set to be 100° C. or higher and 260° C. or lower, and the holding time is set to be 20 seconds or more and 1500 seconds or less. In addition, it is preferable that the holding temperature be 130° C. or higher and 240° C. or lower and that the holding time be 50 seconds or more and 1000 seconds or less.

Here, the meaning of the term "holding" in accordance with aspects of the present invention includes not only a case where the steel sheet is held at a constant temperature but also a case where the temperature varies within the range of the holding temperature according to aspects of the present invention.

Here, the hot rolled steel sheet, which has been subjected to hot rolling, may be subjected to a heating treatment for softening a microstructure. In addition, the surface of the steel sheet may have a coated layer such as a Zn-coated layer or an Al-coated layer. In addition, skin pass rolling for shape correction may be performed after annealing and cooling have been performed or after a coating treatment has been performed.

EXAMPLES

Although the present invention will be specifically described with reference to Examples, the present invention is not limited to these Examples.

Example 1

Each of the steel sheets having the tensile strengths given in Table 1 was cut into a small piece having a size of 30 mm×110 mm. Here, a tensile test was performed in accordance with JIS Z 2241 with a cross head speed of 10 mm/min on a JIS No. 5 test specimen having a gauge length of 50 mm, a gauge width of 25 mm, and a thickness of 1.4 mm which was taken so that the rolling direction of the steel sheet was the tensile direction. The determined tensile strength (TS) and yield strength (YS) are given in Table 1.

Figure 2:
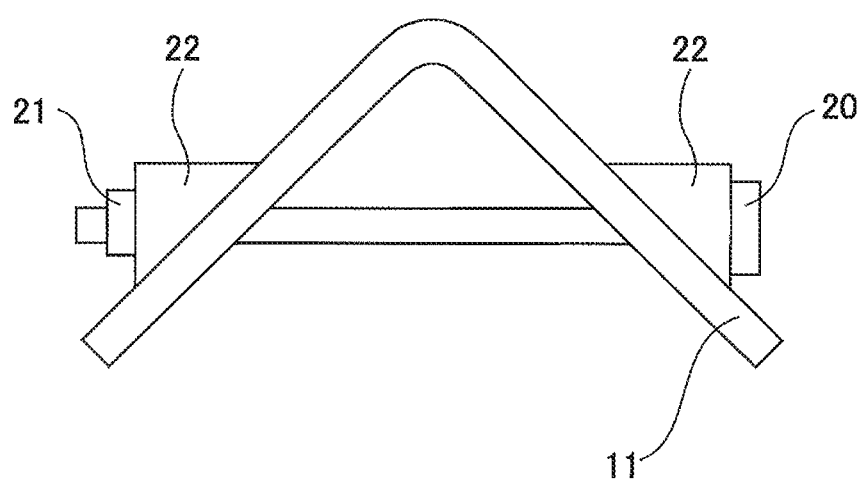
FIG. 2 is a side view of a member fastened with a bolt and a nut in Examples.

In some of the cut steel sheets, the end surface formed by cutting was subjected to an end surface treatment under the conditions given in Table 1. Subsequently, the steel sheet sample was put on a die having a die angle of 90° and pressed by using a punch having a tip angle of 90° so that V-bend forming was performed. Subsequently, as illustrated in the side view in FIG. 2, the bent steel sheet (member) was fastened with a bolt 20, a nut 21, and tapered washers 22 being disposed on the plane surfaces of the steel sheet 11. The relation between the applied stress and the fastening amount was determined by performing CAE (computer aided engineering) analysis, and the fastening amount was set to correspond to the critical applied stress. The critical applied stress was determined by using the method described below. Subsequently, in some of the bent steel sheets (members), the end surface of the steel sheet was subjected to an end surface treatment under the conditions given in Table 1. Conditions applied for the end surface treatment are given in Table 1. Regarding the end surface treatment given in Table 1, "-" in the column "Heat Treatment Temperature (° C.)" denotes a case where the heat treatment was not performed.

2. Evaluation Method

The delayed fracture resistance of each of the members, which had been obtained under various manufacturing conditions, was evaluated in accordance with the critical applied stress, which had been determined by performing a delayed fracture test. In addition, the residual stress and the Vickers hardness in the end surface of the member were determined by using the methods described below. The evaluation methods are as follows.

(Determining Critical Applied Stress)

The critical applied stress was determined by performing a delayed fracture test. Specifically, the critical applied stress was defined as the maximum applied stress with which delayed fracture did not occur when each of the members which had been obtained under various manufacturing conditions was immersed in hydrochloric acid having a pH of 1 (25° C.). A judgement as to whether or not delayed fracture occurred was made by performing visual observation and by using a photographic image taken by using a stereomicroscope at a magnification of 20 times, and a case where a crack was not generated after immersion had been performed for 96 hours was judged as a case of no crack. The term "crack" here denotes a crack having a length of 200 μm or more.

(Determining Residual Stress in End Surface)

Figure 3:
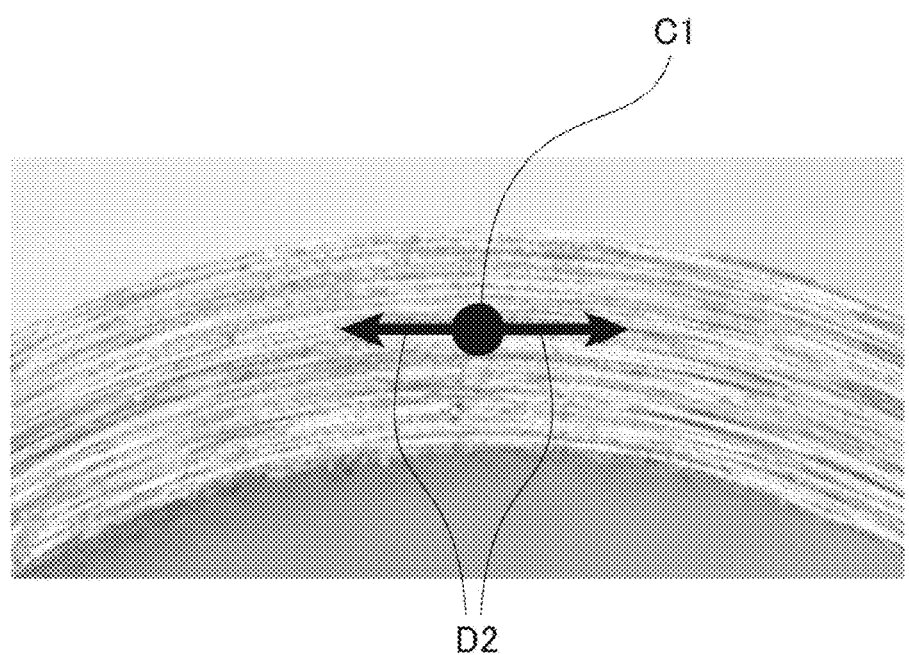
FIG. 3 is an enlarged view of an end surface and illustrates the central position in the thickness direction, which is a measurement position, and a measuring direction in measurement of residual stress in the end surface in Examples.

The residual stress in the end surface of each of the members which had been obtained under various manufacturing conditions was determined by using an X-ray diffraction method. The residual stress was determined at the central position in the thickness direction of the end surface of the bending ridge line portion, and the irradiation diameter of X-ray was 150 μm. The measuring direction was perpendicular to the thickness direction and perpendicular to the bending ridge line direction. FIG. 3 is an enlarged view of an end surface of a bending ridge line portion and illustrates the central position C1 in the thickness direction and the measuring direction D2 with the respective reference signs.

(Determining Vickers Hardness in End Surface)

The Vickers hardness (HV) in the end surface of each of the members which had been obtained under various manufacturing conditions was determined by performing a Vickers hardness test. After the end surface of the bending ridge line portion had been cut in the bending ridge line direction D1, the cut surface was subjected to mirror polishing, and the Vickers hardness was determined at the central position in the thickness direction of the polished surface located 100 μm from the end surface. The measuring load was 1 kgf.

3. Evaluation Result

The evaluation results are given in Table 1.

TABLE 1

| | End Surface Treatment | | Mechanical Property | | | | Delayed Fracture Resistance | | |
|---|---|---|---|---|---|---|---|---|---|
| No. | Heat Treatment Temperature (° C.) | Heat Treatment Time (sec) | YS (MPa) | TS (MPa) | Residual Stress in End Surface (MPa) | Hardness in End Surface (HV) | Critical Applied Stress (MPa) | *1 | Note |
| 1 | 500 | 8 | 1386 | 1490 | 80 | 270 | 1746 | 1.26 | Inventive Example |
| 2 | 800 | 3 | 1184 | 1300 | 60 | 200 | 1385 | 1.17 | Comparative Example |
| 3 | 390 | 3 | 1375 | 1495 | 350 | 370 | 1444 | 1.05 | Comparative Example |
| 4 | 300 | 4 | 1392 | 1513 | 70 | 460 | 1503 | 1.08 | Comparative Example |

TABLE 1-continued

| | End Surface Treatment | | Mechanical Property | | | | Delayed Fracture Resistance | | |
|---|---|---|---|---|---|---|---|---|---|
| No. | Heat Treatment Temperature (° C.) | Heat Treatment Time (sec) | YS (MPa) | TS (MPa) | Residual Stress in End Surface (MPa) | Hardness in End Surface (HV) | Critical Applied Stress (MPa) | *1 | Note |
| 5 | 700 | 5 | 1345 | 1508 | 50 | 240 | 1560 | 1.16 | Inventive Example |
| 6 | 950 | 5 | 1321 | 1501 | 40 | 180 | 1400 | 1.06 | Comparative Example |
| 7 | 700 | 15 | 1333 | 1502 | 50 | 140 | 1386 | 1.04 | Comparative Example |
| 8 | — | — | 1342 | 1511 | 1220 | 650 | 1355 | 1.01 | Comparative Example |

*1: (critical applied stress)/YS

A member having a TS of 1470 MPa or higher and a critical applied stress equal to or higher than the YS multiplied by 1.10 was judged as satisfactory and classified as Inventive Example in Table 1. In addition, a member having a TS of lower than 1470 MPa or a critical applied stress lower than the YS multiplied by 1.10 was judged as unsatisfactory and classified as Comparative Example in Table 1. Here, in Table 1, a case where the value of the expression "(critical applied stress)/YS" is 1.10 or more is a case of a critical applied stress equal to or higher than the YS multiplied by 1.10. As indicated in Table 1, the members of the examples of the present invention had a high strength and excellent delayed fracture resistance.

Example 2

1. Manufacturing Member to be Evaluated

After steels having the chemical compositions given in Table 2 with a balance of Fe and incidental impurities had been obtained by steelmaking by using a vacuum melting furnace, slabbing rolling was performed to obtain slabs having a thickness of 27 mm. Hot rolling was performed on the obtained slabs to obtain hot rolled steel sheets having a thickness of 4.2 mm. Subsequently, grinding was performed on the hot rolled steel sheets to a thickness of 3.2 mm, and cold rolling was performed on the ground steel sheet to obtain cold rolled steel sheets having a thickness of 2.4 mm to 1.12 mm. Subsequently, a heat treatment (annealing process) was performed under the conditions given in Table 3 and Table 4 on the cold rolled steel sheets obtained as described above. Here, each of the blanks in the column "Chemical Composition" in Table 2 denotes a case where the corresponding composition is not intentionally added, that is, a case where the content of the corresponding composition is 0 mass % or a case where the corresponding composition is contained as an incidental impurity. Here, the details of the conditions applied for the hot rolling process, the cold rolling process, and the annealing process are given in Table 3 and Table 4.

Each of the steel sheets which had been subjected to the heat treatment was cut into a small piece having a size of 30 mm×110 mm, and the steel sheet sample was put on a die having a die angle of 90° and pressed by using a punch having a tip angle of 90° so that V-bend forming was performed. Subsequently, as illustrated in the side view in FIG. 2, the bent steel sheet (member) was fastened with a bolt 20, a nut 21, and tapered washers 22 being disposed on the plane surfaces of the steel sheet 11. The relation between the applied stress and the fastening amount was determined by performing CAE (computer aided engineering) analysis, and the fastening amount was set to correspond to the critical applied stress. The critical applied stress was determined by using the method described below.

In each of Nos. 1 to 72 in Table 3 and Table 4, the end surface of the bending ridge line portion was heated at various temperatures after bending work had been performed. In the case of No. 73 in Table 4, the end surface, which had been formed by cutting, was heated after the steel sheet had been cut into a small piece and before the bending work was performed as described above. Conditions applied for the end surface treatment are given in Table 3 and Table 4. Regarding the end surface treatment given in Table 3 and Table 4, "-" in the column "Heat Treatment Temperature (° C.)" denotes a case where the heat treatment was not performed.

TABLE 2

| Steel Grade | Chemical Composition (mass %) | | | | | | | | | $A_{c3}$ Temperature (° C.) |
|---|---|---|---|---|---|---|---|---|---|---|
| | C | Si | Mn | P | S | Al | N | Sb | Other | |
| A | 0.21 | 0.20 | 1.2 | 0.007 | 0.0008 | 0.05 | 0.0021 | 0.01 | | 813 |
| B | 0.17 | 0.20 | 2.8 | 0.008 | 0.0005 | 0.08 | 0.0021 | 0.02 | | 788 |
| C | 0.34 | 0.90 | 1.1 | 0.018 | 0.0002 | 0.02 | 0.0043 | 0.01 | | 809 |
| D | 0.18 | 0.02 | 1.8 | 0.010 | 0.0010 | 0.08 | 0.0043 | 0.01 | | 806 |
| E | 0.28 | 1.15 | 1.1 | 0.007 | 0.0004 | 0.04 | 0.0014 | 0.01 | | 838 |
| F | 0.29 | 0.30 | 1.0 | 0.007 | 0.0010 | 0.08 | 0.0034 | 0.02 | | 820 |
| G | 0.23 | 0.12 | 3.2 | 0.006 | 0.0007 | 0.10 | 0.0046 | 0.03 | | 766 |
| H | 0.31 | 0.40 | 1.2 | 0.015 | 0.0002 | 0.09 | 0.0028 | 0.01 | | 821 |
| I | 0.22 | 0.01 | 2.7 | 0.016 | 0.0004 | 0.04 | 0.0028 | 0.003 | B: 0.0020 | 752 |
| J | 0.23 | 0.30 | 2.9 | 0.018 | 0.0006 | 0.05 | 0.0040 | 0.01 | Nb: 0.0150 | 763 |

TABLE 2-continued

| Steel Grade | Chemical Composition (mass %) | | | | | | | | | $A_{c3}$ Temperature (° C.) |
|---|---|---|---|---|---|---|---|---|---|---|
| | C | Si | Mn | P | S | Al | N | Sb | Other | |
| K | 0.24 | 0.11 | 2.5 | 0.007 | 0.0004 | 0.04 | 0.0051 | 0.01 | Ti: 0.017 | 758 |
| L | 0.28 | 0.20 | 1.6 | 0.009 | 0.0003 | 0.10 | 0.0060 | 0.01 | Cu: 0.15 | 808 |
| M | 0.22 | 0.35 | 2.7 | 0.009 | 0.0001 | 0.06 | 0.0043 | 0.01 | B: 0.0025, Ti: 0.015, Ni: 0.12 | 776 |
| N | 0.23 | 1.10 | 2.8 | 0.009 | 0.0009 | 0.04 | 0.0029 | 0.03 | Nb: 0.0130, Cr: 0.05, Mo: 0.05 | 797 |
| O | 0.25 | 1.00 | 2.4 | 0.009 | 0.0007 | 0.03 | 0.0039 | 0.03 | Cu: 0.13, Cr: 0.03, V: 0.012 | 797 |
| P | 0.24 | 0.10 | 2.6 | 0.018 | 0.0010 | 0.03 | 0.0033 | 0.04 | Zr: 0.009, W: 0.01, Ca: 0.0008, Ce: 0.0009, La: 0.0006, Mg: 0.0005 | 753 |
| Q | 0.27 | 0.10 | 1.8 | 0.007 | 0.0007 | 0.06 | 0.0027 | 0.01 | Sn: 0.004 | 783 |
| R | 0.37 | 0.20 | 1.2 | 0.019 | 0.0002 | 0.04 | 0.0021 | 0.01 | | 776 |
| S | 0.14 | 0.90 | 1.6 | 0.006 | 0.0002 | 0.08 | 0.0055 | 0.01 | | 862 |
| T | 0.21 | 2.40 | 2.8 | 0.008 | 0.0010 | 0.02 | 0.0028 | 0.01 | | 852 |
| U | 0.22 | 0.12 | 3.4 | 0.014 | 0.0006 | 0.07 | 0.0024 | 0.01 | | 750 |
| V | 0.26 | 0.16 | 0.8 | 0.008 | 0.0007 | 0.06 | 0.0010 | 0.01 | | 817 |
| W | 0.28 | 0.84 | 1.4 | 0.030 | 0.0004 | 0.07 | 0.0058 | 0.01 | | 830 |
| X | 0.26 | 0.07 | 1.5 | 0.007 | 0.0020 | 0.06 | 0.0028 | 0.01 | | 792 |
| Y | 0.25 | 0.11 | 1.6 | 0.006 | 0.0003 | 0.25 | 0.0021 | 0.01 | | 880 |
| Z | 0.21 | 0.05 | 2.9 | 0.018 | 0.0008 | 0.07 | 0.0015 | 0.15 | | 765 |

TABLE 3

| No. | Steel Grade | Casting Casting Speed (m/min) | Hot Rolling *1 (° C.) | Hot Rolling *2 (° C.) | Hot Rolling *3 (° C.) | Cold Rolling Reduction Ratio (%) | Annealing Temperature (° C.) | Annealing *4 (° C./sec) | Annealing *5 (° C.) | Holding Temperature (° C.) | Holding Time (sec) | End Surface Treatment Heat Treatment Temperature (° C.) | End Surface Treatment Heat Treatment Time (sec) | Note |
|---|---|---|---|---|---|---|---|---|---|---|---|---|---|---|
| 1 | A | 1.50 | 1250 | 880 | 550 | 56 | 880 | 2060 | 50 | 150 | 500 | 800 | 5 | Inventive Example |
| 2 |  | 1.50 | 1250 | 880 | 550 | 56 | 880 | 2000 | 50 | 150 | 500 | 550 | 5 | Inventive Example |
| 3 |  | 1.50 | 1250 | 880 | 550 | 56 | 880 | 2050 | 50 | 150 | 500 | 300 | 5 | Comparative Example |
| 4 |  | 1.50 | 1250 | 880 | 550 | 56 | 880 | 2100 | 50 | 150 | 500 | 800 | 5 | Inventive Example |
| 5 |  | 1.50 | 1250 | 880 | 550 | 56 | 880 | 1900 | 50 | 150 | 500 | 800 | 8 | Inventive Example |
| 6 |  | 1.50 | 1250 | 880 | 550 | 56 | 880 | 2060 | 50 | 150 | 500 | 800 | 15 | Comparative Example |
| 7 | B | 1.50 | 1220 | 880 | 550 | 56 | 880 | 1910 | 50 | 150 | 500 | 800 | 5 | Inventive Example |
| 8 |  | 1.50 | 1250 | 880 | 550 | 56 | 880 | 2010 | 50 | 150 | 500 | 920 | 5 | Comparative Example |
| 9 |  | 1.50 | 1300 | 880 | 550 | 56 | 880 | 2050 | 50 | 150 | 500 | 800 | 5 | Inventive Example |
| 10 | C | 1.50 | 1250 | 840 | 550 | 56 | 880 | 1920 | 50 | 150 | 500 | 800 | 5 | Inventive Example |
| 11 |  | 1.50 | 1250 | 880 | 550 | 56 | 880 | 1980 | 50 | 150 | 500 | 700 | 5 | Inventive Example |
| 12 |  | 1.50 | 1250 | 900 | 550 | 56 | 880 | 2050 | 50 | 150 | 500 | 600 | 5 | Inventive Example |
| 13 |  | 1.50 | 1250 | 920 | 550 | 56 | 880 | 2010 | 50 | 150 | 500 | 800 | 7 | Inventive Example |
| 14 | D | 1.50 | 1250 | 880 | 550 | 56 | 880 | 2000 | 50 | 150 | 500 | — | — | Comparative Example |
| 15 |  | 1.50 | 1250 | 880 | 550 | 56 | 880 | 1980 | 50 | 200 | 1000 | — | — | Comparative Example |
| 16 |  | 1.50 | 1250 | 880 | 550 | 56 | 880 | 1990 | 50 | 150 | 500 | 800 | 5 | Inventive Example |
| 17 |  | 1.50 | 1250 | 880 | 550 | 56 | 880 | 2080 | 50 | 200 | 1000 | 800 | 5 | Inventive Example |
| 18 | E | 1.50 | 1250 | 880 | 630 | 56 | 880 | 1900 | 50 | 150 | 500 | 800 | 5 | Inventive Example |
| 19 |  | 1.50 | 1250 | 880 | 600 | 56 | 880 | 1960 | 50 | 150 | 500 | 800 | 13 | Comparative Example |
| 20 |  | 1.50 | 1250 | 880 | 550 | 56 | 880 | 1900 | 50 | 150 | 500 | 800 | 2 | Inventive Example |
| 21 |  | 1.50 | 1250 | 880 | 520 | 56 | 880 | 1920 | 50 | 150 | 500 | 800 | 4 | Inventive Example |
| 22 | F | 1.50 | 1250 | 880 | 550 | 25 | 880 | 2040 | 50 | 150 | 500 | 800 | 5 | Inventive Example |
| 23 |  | 1.50 | 1250 | 880 | 550 | 35 | 880 | 1940 | 50 | 150 | 500 | 800 | 5 | Inventive Example |
| 24 |  | 1.50 | 1250 | 880 | 550 | 45 | 880 | 1930 | 50 | 150 | 500 | 800 | 5 | Inventive Example |
| 25 |  | 1.50 | 1250 | 880 | 550 | 65 | 880 | 2010 | 50 | 150 | 500 | 800 | 5 | Inventive Example |
| 26 | G | 1.50 | 1250 | 880 | 550 | 56 | 750 | 1960 | 50 | 150 | 500 | 800 | 5 | Comparative Example |
| 27 |  | 1.50 | 1250 | 880 | 550 | 56 | 780 | 1980 | 50 | 150 | 500 | 800 | 5 | Inventive Example |
| 28 |  | 1.50 | 1250 | 880 | 550 | 56 | 820 | 2080 | 50 | 150 | 500 | 800 | 5 | Inventive Example |
| 29 |  | 1.50 | 1250 | 880 | 550 | 56 | 880 | 1970 | 50 | 150 | 500 | 800 | 5 | Inventive Example |
| 30 | H | 1.50 | 1250 | 880 | 550 | 56 | 880 | 2 | 50 | 150 | 500 | 800 | 5 | Comparative Example |
| 31 |  | 1.50 | 1250 | 880 | 550 | 56 | 880 | 8 | 50 | 150 | 500 | 800 | 5 | Inventive Example |
| 32 |  | 1.50 | 1250 | 880 | 550 | 56 | 880 | 20 | 50 | 150 | 500 | 800 | 5 | Inventive Example |
| 33 |  | 1.50 | 1250 | 880 | 550 | 56 | 880 | 50 | 50 | 150 | 500 | 800 | 5 | Inventive Example |

*1: slab heating temperature,
*2: finishing delivery temperature,
*3: coiling temperature
*4: average cooling rate in a temperature range from the annealing temperature to a temperature of 550° C.,
*5: cooling stop temperature

TABLE 4

| No. | Steel Grade | Casting Casting Speed (m/min) | Hot Rolling *1 (° C.) | Hot Rolling *2 (° C.) | Hot Rolling *3 (° C.) | Cold Rolling Reduction Ratio (%) | Annealing Annealing Temperature (° C.) | Annealing *4 (° C./sec) | Annealing *5 (° C.) | Annealing Holding Temperature (° C.) | Annealing Holding Time (sec) | End Surface Treatment Heat Treatment Temperature (° C.) | End Surface Treatment Heat Treatment Time (sec) | Note |
|---|---|---|---|---|---|---|---|---|---|---|---|---|---|---|
| 34 | I | 1.50 | 1250 | 880 | 550 | 56 | 880 | 1960 | 50 | 150 | 500 | 800 | 5 | Inventive Example |
| 35 |   | 1.50 | 1250 | 880 | 550 | 56 | 880 | 2030 | 200 | 150 | 500 | 800 | 5 | Inventive Example |
| 36 |   | 1.50 | 1250 | 880 | 550 | 56 | 880 | 2000 | 320 | 150 | 500 | 800 | 5 | Inventive Example |
| 37 |   | 1.50 | 1250 | 880 | 550 | 56 | 880 | 1940 | 400 | 150 | 500 | 800 | 5 | Comparative Example |
| 38 | J | 1.50 | 1250 | 880 | 550 | 56 | 880 | 2060 | 50 | 80 | 500 | 800 | 5 | Comparative Example |
| 39 |   | 1.50 | 1250 | 880 | 550 | 56 | 880 | 2080 | 50 | 150 | 500 | 800 | 5 | Inventive Example |
| 40 |   | 1.50 | 1250 | 880 | 550 | 56 | 880 | 2000 | 50 | 200 | 500 | 800 | 5 | Inventive Example |
| 41 |   | 1.50 | 1250 | 880 | 550 | 56 | 880 | 2020 | 50 | 270 | 500 | 800 | 5 | Comparative Example |
| 42 | K | 1.50 | 1250 | 880 | 550 | 56 | 880 | 1900 | 50 | 150 | 10 | 800 | 5 | Comparative Example |
| 43 |   | 1.50 | 1250 | 880 | 550 | 56 | 880 | 2060 | 50 | 150 | 100 | 800 | 5 | Inventive Example |
| 44 |   | 1.50 | 1250 | 880 | 550 | 56 | 880 | 2020 | 50 | 150 | 500 | 800 | 5 | Inventive Example |
| 45 |   | 1.50 | 1250 | 880 | 550 | 56 | 880 | 2030 | 50 | 150 | 1800 | 800 | 5 | Comparative Example |
| 46 | L | 1.50 | 1250 | 880 | 550 | 56 | 880 | 1940 | 50 | 150 | 500 | 920 | 5 | Comparative Example |
| 47 |   | 1.50 | 1250 | 880 | 550 | 56 | 880 | 1900 | 50 | 150 | 500 | 380 | 5 | Comparative Example |
| 48 |   | 1.50 | 1250 | 880 | 550 | 56 | 880 | 1920 | 50 | 150 | 500 | 700 | 5 | Inventive Example |
| 49 | M | 1.50 | 1250 | 880 | 550 | 56 | 880 | 1970 | 50 | 150 | 500 | — | — | Comparative Example |
| 50 |   | 1.50 | 1250 | 880 | 550 | 56 | 880 | 1960 | 50 | 150 | 500 | 420 | 5 | Inventive Example |
| 51 |   | 1.50 | 1250 | 880 | 550 | 56 | 880 | 2000 | 50 | 150 | 500 | 750 | 5 | Inventive Example |
| 52 | N | 1.50 | 1250 | 880 | 550 | 56 | 880 | 1910 | 50 | 150 | 500 | 800 | 1 | Inventive Example |
| 53 |   | 1.50 | 1250 | 880 | 550 | 56 | 880 | 2050 | 50 | 150 | 500 | 800 | 6 | Inventive Example |
| 54 |   | 1.50 | 1250 | 880 | 550 | 56 | 880 | 1900 | 50 | 150 | 500 | 800 | 15 | Comparative Example |
| 55 | O | 1.50 | 1250 | 880 | 550 | 56 | 880 | 2090 | 50 | 50 | 500 | 800 | 5 | Inventive Example |
| 56 |   | 1.50 | 1250 | 880 | 550 | 56 | 880 | 2000 | 50 | 150 | 500 | 800 | 5 | Inventive Example |
| 57 |   | 1.50 | 1250 | 880 | 550 | 56 | 880 | 1990 | 50 | 300 | 500 | 800 | 5 | Comparative Example |
| 58 | P | 1.50 | 1250 | 880 | 550 | 56 | 880 | 1990 | 10 | 150 | 500 | 800 | 5 | Inventive Example |
| 59 |   | 1.50 | 1250 | 880 | 550 | 56 | 880 | 1980 | 120 | 150 | 500 | 800 | 5 | Inventive Example |
| 60 |   | 1.50 | 1250 | 880 | 550 | 56 | 880 | 2020 | 370 | 150 | 500 | 800 | 5 | Comparative Example |
| 61 | Q | 1.30 | 1250 | 880 | 550 | 56 | 880 | 2020 | 50 | 150 | 500 | 850 | 5 | Inventive Example |
| 62 |   | 1.50 | 1250 | 880 | 550 | 56 | 880 | 2080 | 50 | 150 | 500 | 750 | 5 | Inventive Example |
| 63 |   | 1.70 | 1250 | 880 | 550 | 56 | 880 | 1910 | 50 | 150 | 500 | 600 | 5 | Inventive Example |
| 64 | R | 1.50 | 1250 | 880 | 550 | 56 | 880 | 2080 | 50 | 150 | 500 | 800 | 5 | Comparative Example |
| 65 | S | 1.50 | 1250 | 880 | 550 | 56 | 880 | 2050 | 50 | 150 | 500 | 800 | 5 | Comparative Example |
| 66 | T | 1.50 | 1250 | 880 | 550 | 56 | 880 | 1920 | 50 | 150 | 500 | 800 | 5 | Comparative Example |
| 67 | U | 1.50 | 1250 | 880 | 550 | 56 | 880 | 2090 | 50 | 150 | 500 | 800 | 5 | Comparative Example |
| 68 | V | 1.50 | 1250 | 880 | 550 | 56 | 880 | 1960 | 50 | 150 | 500 | 800 | 5 | Comparative Example |
| 69 | W | 1.50 | 1250 | 880 | 550 | 56 | 880 | 1980 | 50 | 150 | 500 | 800 | 5 | Comparative Example |
| 70 | X | 1.50 | 1250 | 880 | 550 | 56 | 880 | 2080 | 50 | 150 | 500 | 800 | 5 | Comparative Example |
| 71 | Y | 1.50 | 1250 | 880 | 550 | 56 | 880 | 1970 | 50 | 150 | 500 | 800 | 5 | Comparative Example |
| 72 | Z | 1.50 | 1250 | 880 | 550 | 56 | 880 | 2100 | 50 | 150 | 500 | 800 | 5 | Comparative Example |
| 73 | A | 1.50 | 1250 | 880 | 550 | 56 | 880 | 2050 | 50 | 150 | 500 | 700 | 5 | Inventive Example |

*1: slab heating temperature,
*2: finishing delivery temperature,
*3: coiling temperature
*4: average cooling rate in a temperature range from the annealing temperature to a temperature of 550° C., TABLE 4-continued

| | Casting | Hot Rolling | | | Cold Rolling Rolling | Annealing | | | | | End Surface Treatment | | |
|---|---|---|---|---|---|---|---|---|---|---|---|---|---|
| Steel No. | Grade | Casting Speed (m/min) | *1 (° C.) | *2 (° C.) | *3 (° C.) | Reduction Ratio (%) | Annealing Temperature (° C.) | *4 (° C./sec) | *5 (° C.) | Holding Temperature (° C.) | Holding Time (sec) | Heat Treatment Temperature (° C.) | Heat Treatment Time (sec) | Note |

*5: cooling stop temperature

2. Evaluation Method

The phase fractions of the members, which had been obtained under various manufacturing conditions, were investigated by analyzing the steel metallographic structure (microstructure). In addition, the tensile properties such as tensile strength were evaluated by performing a tensile test, and the delayed fracture resistance was evaluated in accordance with the critical applied stress which had been determined by performing a delayed fracture test. In addition, the residual stress and the Vickers hardness in the end surface of the member were determined by using the methods described below. The evaluation methods are as follows.

(Total Area Fraction of One or Both of Bainite Containing Carbides Having an Average Grain Size of 50 nm or Less and Martensite Containing Carbides Having an Average Grain Size of 50 nm or Less)

A test specimen was taken from the steel sheet, which had been obtained by performing the annealing process, (hereinafter, referred to as an "annealed steel sheet") so that the longitudinal direction was perpendicular to the rolling direction, the thickness L-cross section parallel to the rolling direction was subjected to mirror polishing, and the polished cross section was subjected to etching in a nital solution to expose a microstructure. The exposed microstructure was observed by using a scanning electron microscope at a magnification of 1500 times to take a SEM photographic image, a point-counting method, in which a grid having a grid interval of 4.8 μm and a size of 16 mm×15 mm was put on a region in the SEM photographic image having a real size of 82 μm×57 μm to count the grid points on each of the phases, was used to determine the area fraction of bainite containing carbides having an average grain size of 50 nm or less and the area fraction of martensite containing carbides having an average grain size of 50 nm or less, and the total area fraction of the two phases was determined. The area fraction was defined as an average area fraction in three different SEM photographic images taken at a magnification of 1500 times. Martensite is identified as a white phase, and bainite is identified as a black phase in which carbides having a small grain size are precipitated. The average grain size of carbides was determined by using the method described below. In addition, the term "area fraction" denotes an area fraction with respect to the whole observation area, and this fraction was defined as the area fraction with respect to the whole steel sheet microstructure.

(Average Grain Size of Carbides within Bainite and Martensite Grains)

A test specimen was taken from the annealed steel sheet so that the longitudinal direction was a direction perpendicular to the rolling direction, the thickness L-cross section parallel to the rolling direction was subjected to mirror polishing, and the polished cross section was subjected to etching in a nital solution to expose a microstructure. The exposed microstructure was observed by using a scanning electron microscope at a magnification of 5000 times to take a SEM photographic image, binary image analysis was performed on the taken photographic image to determine the total area of carbides, and the average area of the carbides was defined as the number average area calculated from the total area. The average grain size was defined as the circle-equivalent diameter calculated from the number average area.

(Tensile Test)

A tensile test was performed in accordance with JIS Z 2241 with a cross head speed of 10 mm/min on a JIS No. 5 test specimen having a gauge length of 50 mm, a gauge width of 25 mm, a thickness of 1.4 mm which had been taken from the annealed steel sheet so that the rolling direction of the steel sheet was the tensile direction to determine tensile strength (TS) and yield strength (YS).

(Determining Critical Applied Stress)

The critical applied stress was determined by performing a delayed fracture test. Specifically, the critical applied stress was defined as the maximum applied stress with which delayed fracture did not occur when each of the members which had been obtained under various manufacturing conditions was immersed in hydrochloric acid having a pH of 1 (25° C.). A judgement as to whether or not delayed fracture occurred was made by performing visual observation and by using a photographic image taken by using a stereomicroscope at a magnification of 20 times, and a case where a crack was not generated after immersion had been performed for 96 hours was judged as a case of no crack. The term "crack" here denotes a crack having a length of 200 μm or more.

(Determining Residual Stress in End Surface)

The residual stress in the end surface of each of the members which had been obtained under various manufacturing conditions was determined by using an X-ray diffraction method. The residual stress was determined at the central position in the thickness direction of the end surface of the bending ridge line portion, and the irradiation diameter of X-ray was 150 μm. The measuring direction was perpendicular to the thickness direction and perpendicular to the bending ridge line direction. FIG. 3 is an enlarged view of an end surface of a bending ridge line portion and illustrates the central position C1 in the thickness direction and the measuring direction D2 with the respective reference signs.

(Determining Vickers Hardness in End Surface)

The Vickers hardness (HV) in the end surface of each of the members which had been obtained under various manufacturing conditions was determined by performing a Vickers hardness test. After the end surface of the bending ridge line portion had been cut in the bending ridge line direction D1, the cut surface was subjected to mirror polishing, and the Vickers hardness was determined at the central position in the thickness direction of the polished surface located 100 μm from the end surface. The measuring load was 1 kgf.

3. Evaluation Result

The results of the evaluation described above are given in Table 5 and Table 6.

TABLE 5

| No. | Steel Grade | Steel Metallographic Structure *1 (%) | Mechanical Property | | | | Delayed Fracture Resistance | | |
| | | | YS (MPa) | TS (MPa) | Residual Stress in End Surface (MPa) | Hardness in End Surface (HV) | Critical Applied Stress (MPa) | *2 | Note |
|---|---|---|---|---|---|---|---|---|---|
| 1 | A | 93 | 1386 | 1490 | 80 | 270 | 1746 | 1.26 | Inventive Example |
| 2 | | 93 | 1404 | 1510 | 150 | 370 | 1643 | 1.17 | Inventive Example |

TABLE 5-continued

| No. | Steel Grade | Steel Metallographic Structure *1 (%) | YS (MPa) | TS (MPa) | Residual Stress in End Surface (MPa) | Hardness in End Surface (HV) | Critical Applied Stress (MPa) | *2 | Note |
|---|---|---|---|---|---|---|---|---|---|
| 3 |   | 92 | 1375 | 1495 | 350 | 470 | 1444 | 1.05 | Comparative Example |
| 4 |   | 92 | 1392 | 1513 | 70 | 260 | 1782 | 1.28 | Inventive Example |
| 5 |   | 93 | 1402 | 1508 | 50 | 240 | 1627 | 1.16 | Inventive Example |
| 6 |   | 94 | 1411 | 1501 | 40 | 180 | 1496 | 1.06 | Comparative Example |
| 7 | B | 93 | 1748 | 1880 | 90 | 250 | 2133 | 1.22 | Inventive Example |
| 8 |   | 95 | 1777 | 1870 | 30 | 175 | 1901 | 1.07 | Comparative Example |
| 9 |   | 95 | 1781 | 1875 | 140 | 390 | 2227 | 1.25 | Inventive Example |
| 10 | C | 93 | 1572 | 1690 | 100 | 330 | 1745 | 1.11 | Inventive Example |
| 11 |   | 96 | 1637 | 1705 | 120 | 390 | 1850 | 1.13 | Inventive Example |
| 12 |   | 94 | 1607 | 1710 | 140 | 400 | 1784 | 1.11 | Inventive Example |
| 13 |   | 95 | 1618 | 1703 | 120 | 290 | 1844 | 1.14 | Inventive Example |
| 14 | D | 95 | 1515 | 1595 | 550 | 320 | 1394 | 0.92 | Comparative Example |
| 15 |   | 93 | 1475 | 1586 | 580 | 360 | 1239 | 0.84 | Comparative Example |
| 16 |   | 93 | 1481 | 1592 | 80 | 330 | 1806 | 1.22 | Inventive Example |
| 17 |   | 94 | 1493 | 1588 | 50 | 300 | 1642 | 1.10 | Inventive Example |
| 18 | E | 93 | 1458 | 1568 | 80 | 290 | 1692 | 1.16 | Inventive Example |
| 19 |   | 92 | 1446 | 1572 | 10 | 175 | 1388 | 0.96 | Comparative Example |
| 20 |   | 95 | 1500 | 1579 | 220 | 420 | 1695 | 1.13 | Inventive Example |
| 21 |   | 91 | 1444 | 1587 | 100 | 320 | 1690 | 1.17 | Inventive Example |
| 22 | F | 96 | 1512 | 1575 | 130 | 290 | 1845 | 1.22 | Inventive Example |
| 23 |   | 92 | 1445 | 1571 | 110 | 350 | 1749 | 1.21 | Inventive Example |
| 24 |   | 96 | 1511 | 1574 | 140 | 320 | 1843 | 1.22 | Inventive Example |
| 25 |   | 91 | 1435 | 1577 | 90 | 330 | 1751 | 1.22 | Inventive Example |
| 26 | G | 76 | 1102 | 1450 | 130 | 330 | 1300 | 1.18 | Comparative Example |
| 27 |   | 91 | 1492 | 1640 | 130 | 280 | 1746 | 1.17 | Inventive Example |
| 28 |   | 93 | 1665 | 1790 | 70 | 400 | 1948 | 1.17 | Inventive Example |
| 29 |   | 94 | 1805 | 1920 | 120 | 380 | 2094 | 1.16 | Inventive Example |
| 30 | H | 79 | 1090 | 1380 | 100 | 340 | 1156 | 1.06 | Comparative Example |
| 31 |   | 90 | 1332 | 1480 | 140 | 260 | 1532 | 1.15 | Inventive Example |
| 32 |   | 92 | 1398 | 1520 | 140 | 340 | 1692 | 1.21 | Inventive Example |
| 33 |   | 91 | 1420 | 1560 | 140 | 400 | 1718 | 1.21 | Inventive Example |

*1: total area fraction of one or both of bainite containing carbides having an average grain size of 50 nm or less and martensite containing carbides having an average grain size of 50 nm or less
*2: (critical applied stress)/YS

TABLE 6

| No. | Steel Grade | Steel Metallographic Structure *1 (%) | YS (MPa) | TS (MPa) | Residual Stress in End Surface (MPa) | Hardness in End Surface (HV) | Critical Applied Stress (MPa) | *2 | Note |
|---|---|---|---|---|---|---|---|---|---|
| 34 | I | 96 | 1867 | 1945 | 130 | 240 | 2297 | 1.23 | Inventive Example |
| 35 |   | 93 | 1800 | 1935 | 80 | 290 | 2033 | 1.13 | Inventive Example |
| 36 |   | 94 | 1805 | 1920 | 50 | 340 | 2021 | 1.12 | Inventive Example |
| 37 |   | 97 | 1848 | 1905 | 90 | 480 | 1903 | 1.03 | Comparative Example |
| 38 | J | 98 | 1970 | 2010 | 80 | 480 | 1989 | 1.01 | Comparative Example |
| 39 |   | 94 | 1894 | 2015 | 60 | 380 | 2292 | 1.21 | Inventive Example |
| 40 |   | 98 | 1965 | 2005 | 150 | 300 | 2181 | 1.11 | Inventive Example |
| 41 |   | 92 | 1835 | 1995 | 140 | 190 | 1854 | 1.01 | Comparative Example |
| 42 | K | 97 | 1858 | 1915 | 80 | 490 | 1988 | 1.07 | Comparative Example |
| 43 |   | 92 | 1766 | 1920 | 120 | 430 | 2155 | 1.22 | Inventive Example |
| 44 |   | 94 | 1803 | 1918 | 80 | 250 | 2254 | 1.25 | Inventive Example |
| 45 |   | 93 | 1762 | 1895 | 90 | 160 | 1850 | 1.05 | Comparative Example |
| 46 | L | 93 | 1604 | 1725 | 50 | 160 | 1749 | 1.09 | Comparative Example |
| 47 |   | 98 | 1697 | 1732 | 320 | 460 | 1833 | 1.08 | Comparative Example |
| 48 |   | 92 | 1590 | 1728 | 70 | 370 | 2035 | 1.28 | Inventive Example |
| 49 | M | 95 | 1838 | 1935 | 510 | 470 | 1783 | 0.97 | Comparative Example |
| 50 |   | 93 | 1806 | 1942 | 160 | 340 | 2131 | 1.18 | Inventive Example |
| 51 |   | 95 | 1879 | 1978 | 110 | 300 | 2386 | 1.27 | Inventive Example |
| 52 | N | 97 | 1930 | 1990 | 120 | 290 | 2162 | 1.12 | Inventive Example |
| 53 |   | 92 | 1827 | 1986 | 80 | 260 | 2247 | 1.23 | Inventive Example |
| 54 |   | 93 | 1848 | 1987 | 20 | 150 | 1922 | 1.04 | Comparative Example |
| 55 | O | 94 | 1791 | 1905 | 210 | 460 | 1934 | 1.08 | Comparative Example |
| 56 |   | 94 | 1794 | 1908 | 130 | 400 | 2278 | 1.27 | Inventive Example |
| 57 |   | 95 | 1811 | 1906 | 60 | 180 | 1937 | 1.07 | Comparative Example |
| 58 | P | 92 | 1792 | 1948 | 110 | 300 | 2115 | 1.18 | Inventive Example |
| 59 |   | 95 | 1854 | 1952 | 50 | 400 | 2077 | 1.12 | Inventive Example |
| 60 |   | 97 | 1880 | 1938 | 60 | 470 | 1823 | 0.97 | Comparative Example |

TABLE 6-continued

|  |  |  | Mechanical Property | | | | Delayed Fracture Resistance | | |
| --- | --- | --- | --- | --- | --- | --- | --- | --- | --- |
| No. | Steel Grade | Steel Metallographic Structure *1 (%) | YS (MPa) | TS (MPa) | Residual Stress in End Surface (MPa) | Hardness in End Surface (HV) | Critical Applied Stress (MPa) | *2 | Note |
| 61 | Q | 97 | 1715 | 1768 | 50 | 370 | 2212 | 1.29 | Inventive Example |
| 62 |   | 95 | 1684 | 1773 | 100 | 310 | 2122 | 1.26 | Inventive Example |
| 63 |   | 93 | 1645 | 1769 | 70 | 270 | 1925 | 1.17 | Inventive Example |
| 64 | R | 92 | 1649 | 1792 | 350 | 480 | 1698 | 1.03 | Comparative Example |
| 65 | S | 92 | 1320 | 1435 | 50 | 260 | 1663 | 1.26 | Comparative Example |
| 66 | T | 94 | 1831 | 1948 | 130 | 460 | 1886 | 1.03 | Comparative Example |
| 67 | U | 98 | 2112 | 2155 | 110 | 460 | 2260 | 1.07 | Comparative Example |
| 68 | V | 93 | 1350 | 1452 | 80 | 330 | 1715 | 1.27 | Comparative Example |
| 69 | W | 94 | 1573 | 1673 | 220 | 500 | 1667 | 1.06 | Comparative Example |
| 70 | X | 96 | 1593 | 1659 | 120 | 460 | 1704 | 1.07 | Comparative Example |
| 71 | Y | 91 | 1521 | 1671 | 80 | 470 | 1612 | 1.06 | Comparative Example |
| 72 | Z | 94 | 1579 | 1680 | 60 | 480 | 1627 | 1.03 | Comparative Example |
| 73 | A | 97 | 1448 | 1531 | 160 | 320 | 1622 | 1.12 | Inventive Example |

*1: total area fraction of one or both of bainite containing carbides having an average grain size of 50 nm or less and martensite containing carbides having an average grain size of 50 nm or less
*2: (critical applied stress)/YS In the present example, a member having a TS of 1470 MPa or higher and a critical applied stress equal to or higher than the YS multiplied by 1.10 was judged as satisfactory and classified as Inventive Example in Table 5 and Table 6. In addition, a member having a TS of lower than 1470 MPa or a critical applied stress lower than the YS multiplied by 1.10 was judged as unsatisfactory and classified as Comparative Example in Table 5 and Table 6. Here, in Table 5 and Table 6, a case where the value of the expression "(critical applied stress)/YS" is 1.10 or more is a case of a critical applied stress equal to or higher than the YS multiplied by 1.10. As indicated in Table 5 and Table 6, the members of the examples of the present invention had a high strength and excellent delayed fracture resistance.

Example 3

In Example 3, members were manufactured from steel grades containing no Sb to perform evaluation.
1. Manufacturing Member to be Evaluated
After steels having the chemical compositions given in Table 7 with a balance of Fe and incidental impurities had been obtained by steelmaking by using a vacuum melting furnace, slabbing rolling was performed to obtain slabs having a thickness of 27 mm. Hot rolling was performed on the obtained slabs to obtain hot rolled steel sheets having a thickness of 4.2 mm. Subsequently, grinding was performed on the hot rolled steel sheets to a thickness of 3.2 mm, and cold rolling was performed on the ground steel sheet to obtain cold rolled steel sheets having a thickness of 2.4 mm to 1.12 mm. Subsequently, a heat treatment (annealing process) was performed on the obtained cold rolled steel sheets under the conditions given in Table 8. Here, each of the blanks in the column "Chemical Composition" in Table 7 denotes a case where the corresponding composition is not intentionally added, that is, a case where the content of the corresponding composition is 0 mass % or a case where the corresponding composition is contained as an incidental impurity. Here, the details of the conditions applied for the hot rolling process, the cold rolling process, and the annealing process are given in Table 8.

Each of the steel sheets which had been subjected to the heat treatment was cut into a small piece having a size of 30 mm×110 mm, and the steel sheet sample was put on a die having a die angle of 90° and pressed by using a punch having a tip angle of 90° so that V-bend forming was performed. Subsequently, as illustrated in the side view in FIG. 2, the bent steel sheet (member) was fastened with a bolt 20, a nut 21, and tapered washers 22 being disposed on the plane surfaces of the steel sheet 11. The relation between the applied stress and the fastening amount was determined by performing CAE (computer aided engineering) analysis, and the fastening amount was set to correspond to the critical applied stress. The critical applied stress was determined by using the method described in Example 2.

After bending work had been performed, the end surfaces of the bending ridge line portions were heated at various temperatures. The conditions applied for end surface treatment are given in table 8.

TABLE 7

| Steel Grade | Chemical Composition (mass %) | | | | | | | | $A_{c3}$ Temperature (° C.) |
| --- | --- | --- | --- | --- | --- | --- | --- | --- | --- |
|  | C | Si | Mn | P | S | Al | N | Other |  |
| A | 0.21 | 0.20 | 1.2 | 0.007 | 0.0008 | 0.05 | 0.0021 |  | 813 |
| B | 0.17 | 0.20 | 2.8 | 0.008 | 0.0005 | 0.08 | 0.0021 |  | 788 |
| C | 0.34 | 0.90 | 1.1 | 0.018 | 0.0002 | 0.02 | 0.0043 |  | 809 |
| D | 0.28 | 1.15 | 1.1 | 0.007 | 0.0004 | 0.04 | 0.0014 |  | 838 |
| E | 0.29 | 0.30 | 1.0 | 0.007 | 0.0010 | 0.08 | 0.0034 |  | 820 |
| F | 0.23 | 0.12 | 3.2 | 0.006 | 0.0007 | 0.10 | 0.0046 |  | 766 |
| G | 0.31 | 0.40 | 1.2 | 0.015 | 0.0002 | 0.09 | 0.0028 |  | 821 |
| H | 0.22 | 0.01 | 2.7 | 0.016 | 0.0004 | 0.04 | 0.0028 | B: 0.0020 | 752 |
| I | 0.23 | 0.30 | 2.9 | 0.018 | 0.0006 | 0.05 | 0.0040 | Nb: 0.0150 | 763 |
| J | 0.24 | 0.11 | 2.5 | 0.007 | 0.0004 | 0.04 | 0.0051 | Ti: 0.017 | 758 |

TABLE 7-continued

| Steel Grade | Chemical Composition (mass %) | | | | | | | | $A_{c3}$ Temperature (° C.) |
|---|---|---|---|---|---|---|---|---|---|
| | C | Si | Mn | P | S | Al | N | Other | |
| K | 0.28 | 0.20 | 1.6 | 0.009 | 0.0003 | 0.10 | 0.0060 | Cu: 0.15 | 808 |
| L | 0.22 | 0.35 | 2.7 | 0.009 | 0.0001 | 0.06 | 0.0043 | B: 0.0025, Ti: 0.015, Ni: 0.12 | 776 |
| M | 0.23 | 1.10 | 2.8 | 0.009 | 0.0009 | 0.04 | 0.0029 | Nb: 0.0130, Cr: 0.05, Mo: 0.05 | 797 |
| N | 0.25 | 1.00 | 2.4 | 0.009 | 0.0007 | 0.03 | 0.0039 | Cu: 0.13, Cr: 0.03, V: 0.012 | 797 |
| O | 0.37 | 0.20 | 1.2 | 0.019 | 0.0002 | 0.04 | 0.0021 | | 776 |
| P | 0.14 | 0.90 | 1.6 | 0.006 | 0.0002 | 0.08 | 0.0055 | | 862 |
| Q | 0.21 | 2.40 | 2.8 | 0.008 | 0.0010 | 0.02 | 0.0028 | | 852 |
| R | 0.22 | 0.12 | 3.4 | 0.014 | 0.0006 | 0.07 | 0.0024 | | 750 |
| S | 0.26 | 0.16 | 0.8 | 0.008 | 0.0007 | 0.06 | 0.0010 | | 817 |
| T | 0.28 | 0.84 | 1.4 | 0.030 | 0.0004 | 0.07 | 0.0058 | | 830 |
| U | 0.26 | 0.07 | 1.5 | 0.007 | 0.0020 | 0.06 | 0.0028 | | 792 |

TABLE 8

| No. | Steel Grade | Casting Casting Speed (m/min) | Hot Rolling *1 (° C.) | Hot Rolling *2 (° C.) | Hot Rolling *3 (° C.) | Cold Rolling Reduction Ratio (%) | Annealing Annealing Temperature (° C.) | Annealing *4 (° C./sec) | Annealing *5 (° C.) | Annealing Holding Temperature (° C.) | Annealing Holding Time (sec) | End Surface Treatment Heat Treatment Temperature (° C.) | End Surface Treatment Heat Treatment Time (sec) | Note |
|---|---|---|---|---|---|---|---|---|---|---|---|---|---|---|
| 1 | A | 1.40 | 1250 | 880 | 550 | 56 | 880 | 2060 | 50 | 150 | 500 | 800 | 5 | Inventive Example |
| 2 | B | 1.60 | 1250 | 880 | 550 | 56 | 880 | 2060 | 50 | 150 | 500 | 800 | 5 | Inventive Example |
| 3 | B | 1.50 | 1220 | 880 | 550 | 56 | 880 | 2060 | 50 | 150 | 500 | 800 | 5 | Inventive Example |
| 4 | C | 1.50 | 1200 | 880 | 550 | 56 | 880 | 2060 | 50 | 150 | 500 | 800 | 5 | Inventive Example |
| 5 | C | 1.50 | 1250 | 840 | 550 | 56 | 880 | 2060 | 50 | 150 | 500 | 800 | 5 | Inventive Example |
| 6 | D | 1.50 | 1250 | 860 | 550 | 56 | 880 | 2060 | 50 | 150 | 500 | 800 | 5 | Inventive Example |
| 7 | D | 1.50 | 1250 | 880 | 600 | 56 | 880 | 2060 | 50 | 150 | 500 | 800 | 5 | Inventive Example |
| 8 | D | 1.50 | 1250 | 880 | 630 | 56 | 880 | 2060 | 50 | 150 | 500 | 800 | 5 | Inventive Example |
| 9 | E | 1.50 | 1250 | 880 | 550 | 40 | 880 | 2060 | 50 | 150 | 500 | 800 | 5 | Inventive Example |
| 10 | E | 1.50 | 1250 | 880 | 550 | 80 | 880 | 2060 | 50 | 150 | 500 | 800 | 5 | Inventive Example |
| 11 | F | 1.50 | 1250 | 880 | 550 | 56 | 800 | 2060 | 50 | 150 | 500 | 800 | 5 | Inventive Example |
| 12 | F | 1.50 | 1250 | 880 | 550 | 56 | 840 | 2060 | 50 | 150 | 500 | 800 | 5 | Inventive Example |
| 13 | G | 1.50 | 1250 | 880 | 550 | 56 | 880 | 5 | 50 | 150 | 500 | 800 | 5 | Inventive Example |
| 14 | G | 1.50 | 1250 | 880 | 550 | 56 | 880 | 20 | 50 | 150 | 500 | 800 | 5 | Inventive Example |
| 15 | H | 1.50 | 1250 | 880 | 550 | 56 | 880 | 2060 | 320 | 150 | 500 | 800 | 5 | Inventive Example |
| 16 | H | 1.50 | 1250 | 880 | 550 | 56 | 880 | 2060 | 250 | 150 | 500 | 800 | 5 | Inventive Example |
| 17 | I | 1.50 | 1250 | 880 | 550 | 56 | 880 | 2060 | 50 | 120 | 500 | 800 | 5 | Inventive Example |
| 18 | I | 1.50 | 1250 | 880 | 550 | 56 | 880 | 2060 | 50 | 250 | 500 | 800 | 5 | Inventive Example |
| 19 | J | 1.50 | 1250 | 880 | 550 | 56 | 880 | 2060 | 50 | 150 | 30 | 800 | 5 | Inventive Example |
| 20 | J | 1.50 | 1250 | 880 | 550 | 56 | 880 | 2060 | 50 | 150 | 1200 | 800 | 5 | Inventive Example |
| 21 | K | 1.50 | 1250 | 880 | 550 | 56 | 880 | 2060 | 50 | 150 | 500 | 420 | 5 | Inventive Example |
| 22 | K | 1.50 | 1250 | 880 | 550 | 56 | 880 | 2060 | 50 | 150 | 500 | 550 | 5 | Inventive Example |
| 23 | L | 1.50 | 1250 | 880 | 550 | 56 | 880 | 2060 | 50 | 150 | 500 | 800 | 2 | Inventive Example |
| 24 | L | 1.50 | 1250 | 880 | 550 | 56 | 880 | 2060 | 50 | 150 | 500 | 800 | 9 | Inventive Example |
| 25 | M | 1.30 | 1250 | 880 | 550 | 56 | 880 | 2060 | 50 | 150 | 500 | 800 | 8 | Inventive Example |
| 26 | M | 1.70 | 1250 | 880 | 550 | 56 | 880 | 2060 | 50 | 150 | 500 | 800 | 1 | Inventive Example |
| 27 | N | 1.50 | 1250 | 880 | 550 | 56 | 880 | 2060 | 50 | 150 | 500 | 600 | 5 | Inventive Example |
| 28 | N | 1.50 | 1250 | 880 | 550 | 56 | 880 | 2060 | 50 | 150 | 500 | 900 | 5 | Inventive Example |
| 29 | O | 1.50 | 1250 | 880 | 550 | 56 | 880 | 2060 | 50 | 150 | 500 | 800 | 5 | Comparative Example |
| 30 | P | 1.50 | 1250 | 880 | 550 | 56 | 880 | 2060 | 50 | 150 | 500 | 800 | 5 | Comparative Example |
| 31 | Q | 1.50 | 1250 | 880 | 550 | 56 | 880 | 2060 | 50 | 150 | 500 | 800 | 5 | Comparative Example |
| 32 | R | 1.50 | 1250 | 880 | 550 | 56 | 880 | 2060 | 50 | 150 | 500 | 800 | 5 | Comparative Example |
| 33 | S | 1.50 | 1250 | 880 | 550 | 56 | 880 | 2060 | 50 | 150 | 500 | 800 | 5 | Comparative Example |
| 34 | T | 1.50 | 1250 | 880 | 550 | 56 | 880 | 2060 | 50 | 150 | 500 | 800 | 5 | Comparative Example |
| 35 | U | 1.50 | 1250 | 880 | 550 | 56 | 880 | 2060 | 50 | 150 | 500 | 800 | 5 | Comparative Example |

*1: slab heating temperature,
*2: finishing delivery temperature,
*3: coiling temperature
*4: average cooling rate in a temperature range from the annealing temperature to a temperature of 550° C.,
*5: cooling stop temperature 2. Evaluation Method Determination and evaluation were performed on the members obtained under the various manufacturing conditions as in the case of Example 2.

3. Evaluation Result

The evaluation results are given in Table 9.

20 bolt
21 nut
22 tapered washer
C1 central position in thickness direction
D1 bending ridge line direction
D2 measuring direction

TABLE 9

| | | | Mechanical Property | | | | Delayed Fracture Resistance | | |
| --- | --- | --- | --- | --- | --- | --- | --- | --- | --- |
| No. | Steel Grade | Steel Metallographic Structure *1 (%) | YS (MPa) | TS (MPa) | Residual Stress in End Surface (MPa) | Hardness in End Surface (HV) | Critical Applied Stress (MPa) | *2 | Note |
| 1 | A | 98 | 1495 | 1526 | 80 | 280 | 1854 | 1.24 | Inventive Example |
| 2 | | 97 | 1479 | 1525 | 100 | 250 | 1790 | 1.21 | Inventive Example |
| 3 | B | 97 | 1482 | 1528 | 90 | 310 | 1838 | 1.24 | Inventive Example |
| 4 | | 100 | 1523 | 1523 | 90 | 330 | 1889 | 1.24 | Inventive Example |
| 5 | C | 99 | 1510 | 1525 | 90 | 260 | 1902 | 1.26 | Inventive Example |
| 6 | | 98 | 1496 | 1527 | 80 | 280 | 1886 | 1.26 | Inventive Example |
| 7 | D | 98 | 1466 | 1496 | 100 | 270 | 1847 | 1.26 | Inventive Example |
| 8 | | 91 | 1339 | 1471 | 100 | 280 | 1660 | 1.24 | Inventive Example |
| 9 | E | 98 | 1495 | 1526 | 80 | 260 | 1884 | 1.26 | Inventive Example |
| 10 | | 98 | 1492 | 1522 | 90 | 260 | 1864 | 1.25 | Inventive Example |
| 11 | F | 94 | 1384 | 1472 | 90 | 280 | 1716 | 1.24 | Inventive Example |
| 12 | | 97 | 1467 | 1512 | 100 | 260 | 1833 | 1.25 | Inventive Example |
| 13 | G | 93 | 1373 | 1476 | 100 | 310 | 1716 | 1.25 | Inventive Example |
| 14 | | 94 | 1417 | 1507 | 80 | 290 | 1771 | 1.25 | Inventive Example |
| 15 | H | 96 | 1468 | 1529 | 90 | 340 | 1820 | 1.24 | Inventive Example |
| 16 | | 95 | 1450 | 1526 | 90 | 320 | 1812 | 1.25 | Inventive Example |
| 17 | I | 97 | 1481 | 1527 | 100 | 340 | 1851 | 1.25 | Inventive Example |
| 18 | | 99 | 1512 | 1527 | 150 | 230 | 1769 | 1.17 | Inventive Example |
| 19 | J | 100 | 1522 | 1522 | 100 | 360 | 1918 | 1.26 | Inventive Example |
| 20 | | 95 | 1447 | 1523 | 100 | 230 | 1678 | 1.16 | Inventive Example |
| 21 | K | 96 | 1465 | 1526 | 270 | 260 | 1641 | 1.12 | Inventive Example |
| 22 | | 95 | 1447 | 1523 | 210 | 260 | 1693 | 1.17 | Inventive Example |
| 23 | L | 97 | 1476 | 1522 | 180 | 320 | 1727 | 1.17 | Inventive Example |
| 24 | | 97 | 1478 | 1524 | 100 | 250 | 1715 | 1.16 | Inventive Example |
| 25 | M | 100 | 1527 | 1527 | 90 | 230 | 1756 | 1.15 | Inventive Example |
| 26 | | 98 | 1496 | 1527 | 210 | 340 | 1736 | 1.16 | Inventive Example |
| 27 | N | 98 | 1491 | 1521 | 160 | 280 | 1819 | 1.22 | Inventive Example |
| 28 | | 95 | 1449 | 1525 | 80 | 230 | 1710 | 1.18 | Inventive Example |
| 29 | O | 100 | 1728 | 1728 | 80 | 480 | 1780 | 1.03 | Comparative Example |
| 30 | P | 91 | 1205 | 1324 | 80 | 180 | 1578 | 1.31 | Comparative Example |
| 31 | Q | 100 | 1522 | 1522 | 90 | 460 | 1613 | 1.06 | Comparative Example |
| 32 | R | 100 | 1629 | 1629 | 100 | 520 | 1645 | 1.01 | Comparative Example |
| 33 | S | 92 | 1142 | 1241 | 100 | 270 | 1165 | 1.02 | Comparative Example |
| 34 | T | 100 | 1521 | 1521 | 80 | 510 | 1597 | 1.05 | Comparative Example |
| 35 | U | 95 | 1447 | 1523 | 80 | 520 | 1505 | 1.04 | Comparative Example |

*1: total area fraction of one or both of bainite containing carbides having an average grain size of 50 nm or less and martensite containing carbides having an average grain size of 50 nm or less
*2: (critical applied stress)/YS In the present example, a member having a TS of 1470 MPa or higher and a critical applied stress equal to or higher than the YS multiplied by 1.10 was judged as satisfactory and classified as Inventive Example in Table 9. In addition, a member having a TS of lower than 1470 MPa or a critical applied stress lower than the YS multiplied by 1.10 was judged as unsatisfactory and classified as Comparative Example in Table 9. Here, in Table 9, a case where the value of the expression "(critical applied stress)/YS" is 1.10 or more is a case of a critical applied stress equal to or higher than the YS multiplied by 1.10. As indicated in Table 9, the members of the examples of the present invention had a high strength and excellent delayed fracture resistance.

REFERENCE SIGNS LIST 10 high strength member
11 steel sheet
12 bending ridge line portion
13 end surface of bending ridge line portion

The invention claimed is:

1. A high strength member comprising a bending ridge line portion formed from a steel sheet,
   wherein the steel sheet has a chemical composition containing, by mass %,
   C: 0.17% or more and 0.35% or less,
   Si: 0.001% or more and 1.2% or less,
   Mn: 0.9% or more and 3.2% or less,
   P: 0.020% or less,
   S: 0.0010% or less,
   Al: 0.010% or more and 0.20% or less,
   N: 0.010% or less, and a balance of Fe and incidental impurities, and
   a microstructure, in which a total area fraction of one or both of bainite containing carbides having an average grain size of 50 nm or less and martensite containing carbides having an average grain size of 50 nm or less is 90% or more, and the member having
a tensile strength of 1470 MPa or higher,
a residual stress of 300 MPa or lower in an end surface of the bending ridge line portion, and
a Vickers hardness (HV) of 200 or higher and 450 or lower in the end surface of the bending ridge line portion.

2. The high strength member according to claim 1, wherein the steel sheet has a chemical composition containing, by mass %,
C: 0.17% or more and 0.35% or less,
Si: 0.001% or more and 1.2% or less,
Mn: 0.9% or more and 3.2% or less,
P: 0.020% or less,
S: 0.0010% or less,
Al: 0.010% or more and 0.20% or less,
N: 0.010% or less,
Sb: 0.001% or more and 0.10% or less, and a balance of Fe and incidental impurities,
and
a microstructure, in which a total area fraction of one or both of bainite containing carbides having an average grain size of 50 nm or less and martensite containing carbides having an average grain size of 50 nm or less is 90% or more.

3. The high strength member according to claim 1, wherein the steel sheet has the chemical composition further containing at least one selected from the groups of, by mass %,
group A:
B: 0.0002% or more and less than 0.0035%,
group B:
at least one selected from
Nb: 0.002% or more and 0.08% or less, and
Ti: 0.002% or more and 0.12% or less,
group C:
at least one selected from
Cu: 0.005% or more and 1% or less, and
Ni: 0.005% or more and 1% or less,
group D:
at least one selected from
Cr: 0.01% or more and 1.0% or less,
Mo: 0.01% or more and less than 0.3%,
V: 0.003% or more and 0.5% or less,
Zr: 0.005% or more and 0.20% or less, and
W: 0.005% or more and 0.20% or less,
group E:
at least one selected from
Ca: 0.0002% or more and 0.0030% or less,
Ce: 0.0002% or more and 0.0030% or less,
La: 0.0002% or more and 0.0030% or less, and
Mg: 0.0002% or more and 0.0030% or less, and
group F:
Sn: 0.002% or more and 0.1% or less.

4. The high strength member according to claim 1, the member further having a critical applied stress/YS of 1.10 or higher after the member is immersed into pH=1 and 25° C. of hydrochloric acid.

5. The high strength member according to claim 2, wherein the steel sheet has the chemical composition further containing at least one selected from the groups of, by mass %,
group A:
B: 0.0002% or more and less than 0.0035%,
group B:
at least one selected from
Nb: 0.002% or more and 0.08% or less, and
Ti: 0.002% or more and 0.12% or less,
group C:
at least one selected from
Cu: 0.005% or more and 1% or less, and
Ni: 0.005% or more and 1% or less,
group D:
at least one selected from
Cr: 0.01% or more and 1.0% or less,
Mo: 0.01% or more and less than 0.3%,
V: 0.003% or more and 0.5% or less,
Zr: 0.005% or more and 0.20% or less, and
W: 0.005% or more and 0.20% or less,
group E:
at least one selected from
Ca: 0.0002% or more and 0.0030% or less,
Ce: 0.0002% or more and 0.0030% or less,
La: 0.0002% or more and 0.0030% or less, and
Mg: 0.0002% or more and 0.0030% or less, and
group F:
Sn: 0.002% or more and 0.1% or less.

* * * * *